United States Patent [19]

Bond, Jr. et al.

[11] 4,446,459

[45] May 1, 1984

[54] DIGITAL INTERFACE FOR BI-DIRECTIONAL COMMUNICATION BETWEEN A COMPUTER AND A PERIPHERAL DEVICE

[75] Inventors: Hollis H. Bond, Jr.; Carl R. Franklin, both of League City, Tex.

[73] Assignee: The United States of America as represented by the Administrator of the National Aeronautics & Space Administration, Washington, D.C.

[21] Appl. No.: 235,472

[22] Filed: Feb. 18, 1981

[51] Int. Cl.³ .............................................. H04Q 9/00
[52] U.S. Cl. ............................ 340/825.21; 340/825.5; 364/900
[58] Field of Search ........... 340/825.21, 825.5, 825.51, 340/825.87, 825.02; 364/900; 370/85, 91, 99, 31, 32

[56] References Cited

U.S. PATENT DOCUMENTS 4,047,162 9/1977 Dorey et al. ...................... 364/900
4,262,357 4/1981 Shima ............................. 340/825.5

Primary Examiner—Donald J. Yusko
Attorney, Agent, or Firm—Marvin F. Matthews; John R. Manning

[57] ABSTRACT

For transmission of data from the computer to the peripheral, the computer initially clears a flipflop which provides a select signal to a multiplexer. When the computer is ready to provide data to the peripheral, it produces a data available signal or data strobe signal while the data is being provided to the interface. Setting of the flipflop causes a gate connected thereto to provide to the peripheral a signal indicating that the interface has data available for transmission thereto. In response thereto, the peripheral provides an acknowledge or strobe signal to transfer the data to the peripheral. This acknowledge signal is also provided to the gate to shut off the signal being provided to the peripheral. Setting of the flipflop also causes the multiplexer to change state so that it now can multiplex the acknowledge signal to the pulse generator. The pulse generator then resets the flipflop, so that it is now ready for transmission of more data from the computer to the peripheral. For transmission of data from the peripheral to the computer, the computer presents the initially cleared flipflop. The multiplexer can now multiplex to another pulse generator a data request signal from the peripheral indicating that the peripheral has data available for transmission to the computer. This signal and the signal produced by the present flipflop are provided to another gate which in response thereto provides an acknowledge signal to indicate that the interface is ready to receive such data from the peripheral and to strobe that data into the interface. The set flipflop also causes the multiplexer to multiplex to another pulse generator a received delayed version of the peripheral data request signal. This multiplexed signal causes the other pulse generator to reset the flipflop, thereby shutting off the acknowledge signal to the peripheral. Reset of the flipflop also permits the multiplexer to multiplex a data request signal from the computer, indicating that the computer is receiving the peripheral data from the interface, to the second pulse generator. The second pulse generator then toggles the flipflop to set. The interface is now ready to transmit more data from the peripheral to the computer.

6 Claims, 31 Drawing Figures

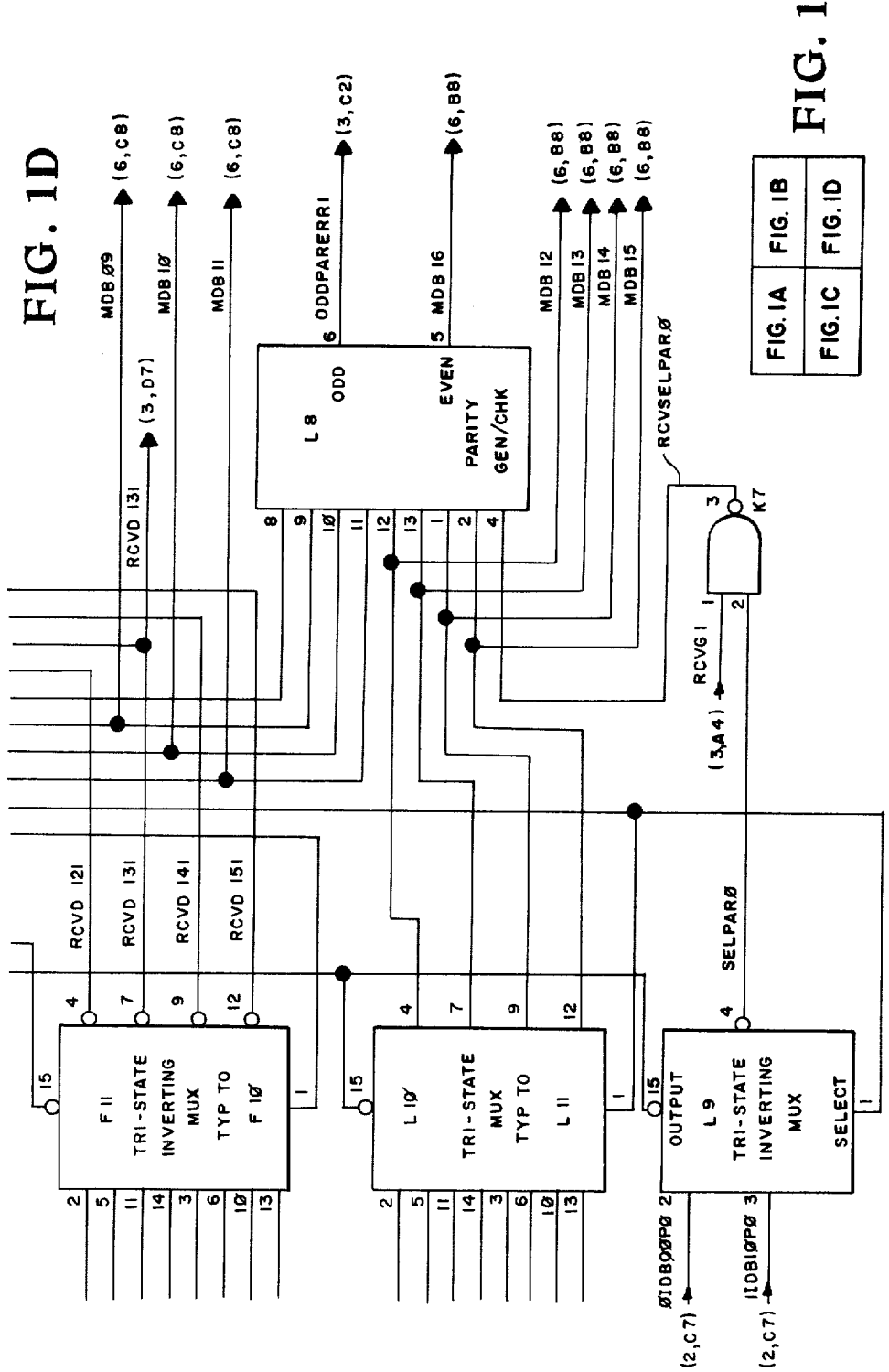

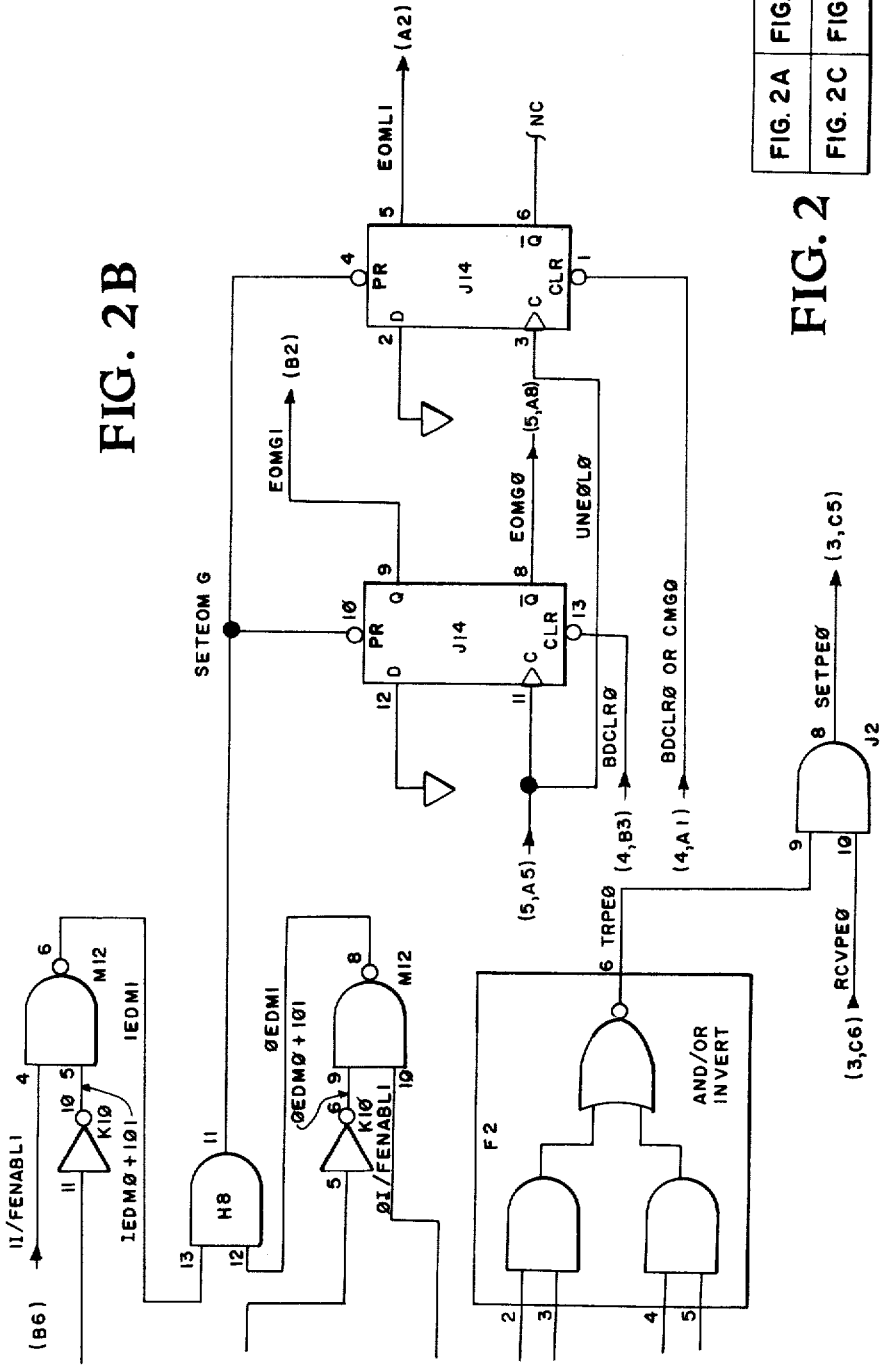

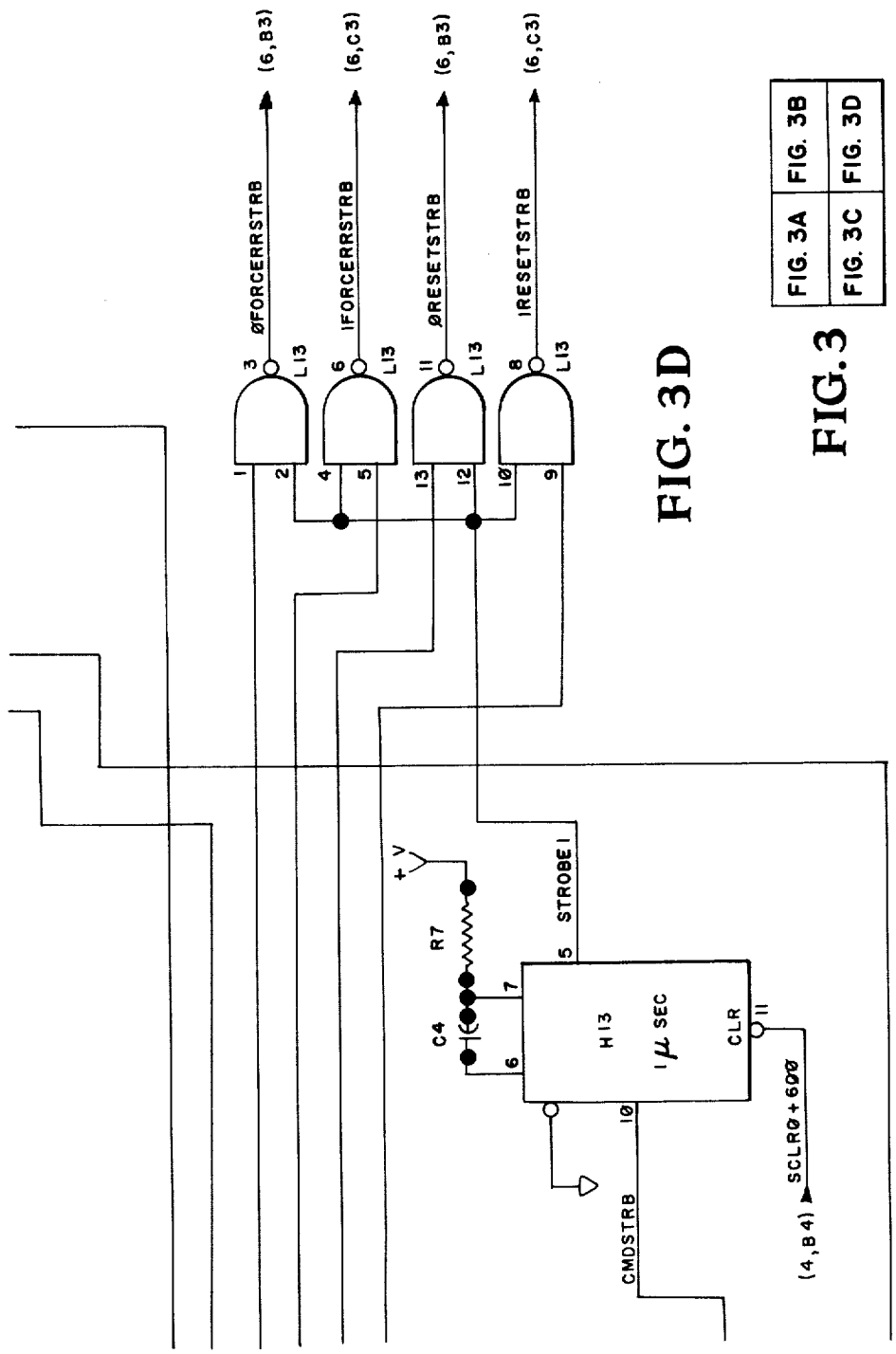

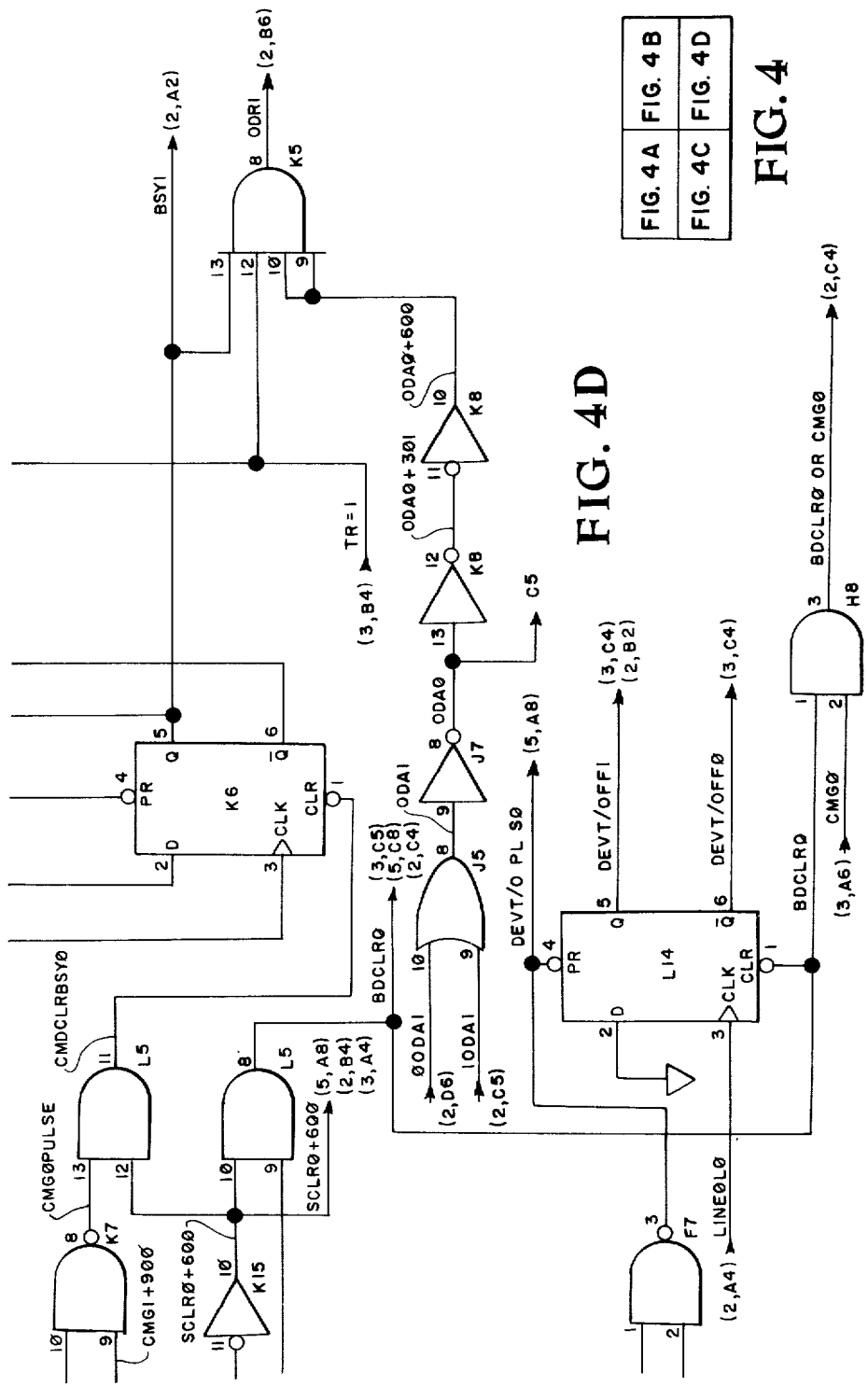

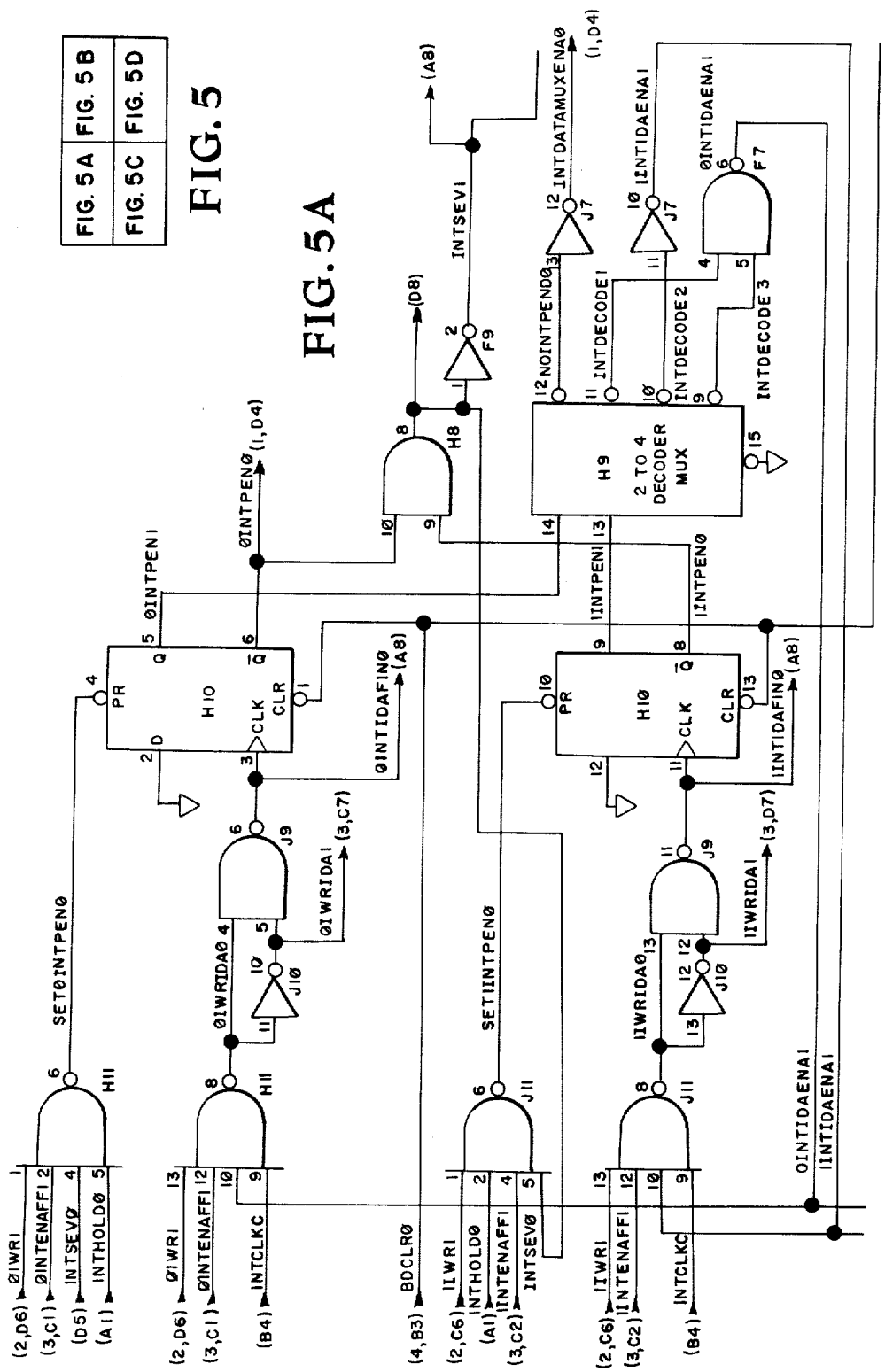

DIGITAL INTERFACE FOR BI-DIRECTIONAL COMMUNICATION BETWEEN A COMPUTER AND A PERIPHERAL DEVICE

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention relates to interfaces, and more particularly to interfaces for transmission of data and other signals between two devices.

Various devices have been employed to interface electronic devices. One such device is the Aydin UXW-324 Interface, described in *Aydin UXW-324 I/O: Interdata Mux Switch A25215TVD-193 Interface No. 150-6400-008*. While such devices have served the purpose for some applications, they have not proven entirely satisfactory under all conditions of service for the following reasons. Where two different devices are being interfaced, having different speeds of operation, and it is decided to transmit information or other signals therebetween, the different speeds can cause loss of such information or other signal. Also, two different devices being interfaced can have different interrupt handling sequences, so that provision of an interrupt from a peripheral device to a computer having different interrupt handling sequences can result in sloppy interrupt handling, loss of interrupts, and system down time resulting from an interrupt being generated but not received. Also, it is necessary to provide some means of having one device inform the other when interrupt handling errors and other errors occur; otherwise, one device can go down or become inoperative because of an error without so informing the other device, which may continue to provide data or other signals thereto. Also, if several devices are together interfaced to another device on the same interface, errors can occur if the latter device is not informed as to which of the several devices it is communicating with, particularly if one of these several devices is generating an interrupt therefor. Also, it is necessary to inform the device receiving signals what sort of signals these are, and to insure that that device is ready to receive same. If one device has a smaller number of I/O lines than the other device, then it is necessary to utilize only the available lines. If more than one type of signal (such as status information or data information) is being applied to the same line, the receiving device would ordinarily be unable to determine the nature of the information being received. This can result in confusion in the system such as where a device is providing status information off an interrupt rather than status information from a data transfer so that it would appear that the transmitting device was processing data when it was generating an interrupt. Without servicing of the interrupt, the transmitting device would not return to its normal mode of operation, and confusion in the system and downtime would result without the system being able to correct such problems itself. This is especially true where one device cannot control when the other device could generate an interrupt.

SUMMARY OF THE INVENTION

Accordingly, it is a general purpose of the present invention to provide an interface capable of interfacing two different devices.

Other objects of the present invention are to provide adequate status information to a processor or controller, identification of the nature of information being transmitted through the interface, compensation for different speeds of devices being interfaced, compensation for different modes of interrupt handling of devices being interfaced, rapid, efficient handling of all interrupts resulting in proper system operation, prevention of loss of data and other signals transmitted through the interface, improved speed of operation, handshaking between interfaced devices to prevent loss of information or signals transmitted therebetween, and ability to provide different kinds of signals on the same lines while identifying the nature of these signals to the receiving device.

Briefly, these and other objects of the present invention are accomplished by an interface for transmission of data, interrupts, and other signals between a computer and a peripheral device such as a display generator or keyboard provided with a CRT or other display. For transmission of data from the computer to the peripheral, the computer initially clears a flipflop which provides a select signal to a multiplexer. The output of the multiplexer is connected to a pulse generator whose output is connected to trigger or toggle the flipflop and cause it to change state. When the computer is ready to provide data to the peripheral, it produces a data available signal or data strobe signal while the data is being provided to the interface. Clearing of the flipflop causes the multiplexer to multiplex this signal to the pulse generator, which sets the flipflop. Setting of the flipflop causes a gate connected thereto to provide to the peripheral a signal indicating that the interface has data available for transmission thereto. In response thereto, the peripheral signal provides an acknowledge or strobe signal to transfer the data to the peripheral. This acknowledge signal is also provided to the gate to shut off the signal being provided to the peripheral. Setting of the flipflop also causes the multiplexer to change state so that it now can multiplex the acknowledge signal to the pulse generator. The pulse generator then resets the flipflop, so that it is now ready for transmission of more data from the computer to the peripheral. For transmission of data from the peripheral to the computer, the computer presets the initially cleared flipflop. The multiplexer can now multiplex to another pulse generator a data request signal from the peripheral indicating that the peripheral has data available for transmission to the computer. This signal and the signal produced by the preset flipflop are provided to another gate which in response thereto provides an acknowledge signal to indicate that the interface is ready to receive such data from the peripheral and to strobe that data into the interface. The set flipflop also causes the multiplexer to multiplex to another pulse generator a received delayed version of the peripheral data request signal. This multiplexed signal causes the other pulse generator to reset the flipflop, thereby shutting off the acknowledge signal to the peripheral. Reset of the flipflop also permits the multiplexer to multiplex a data request signal from the computer, indicating that the computer is receiving the peripheral data from the interface, to the second pulse generator. The second pulse generator then toggles the flipflop to set. The interface is now ready to transmit more data from the peripheral to the computer.

Other objects, advantages and novel features of the invention will become apparent from the following detailed description of the invention when considered in conjunction with the accompanying drawings wherein:

DESCRIPTION OF THE PREFERRED EMBODIMENT

Figure 1A:
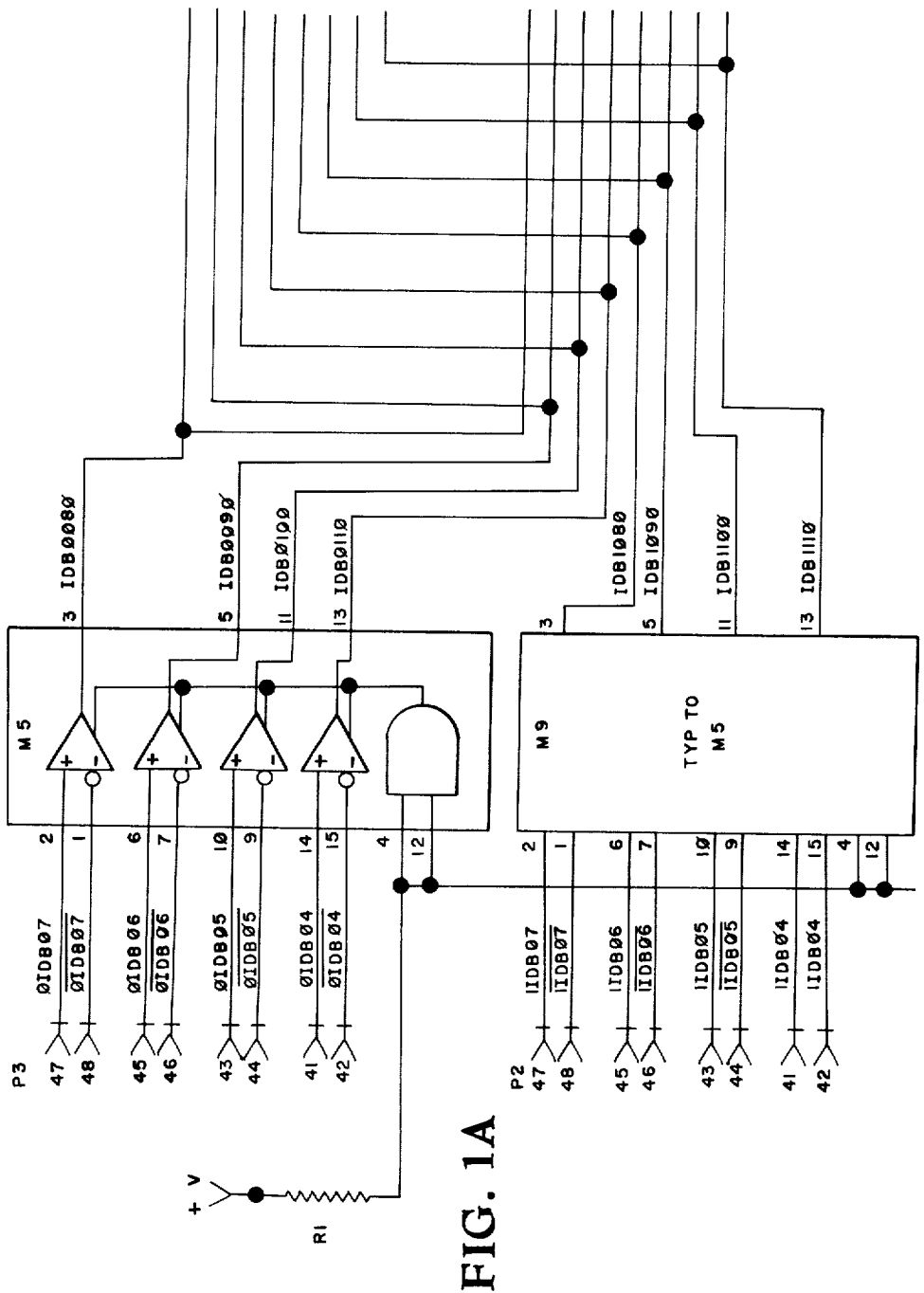
FIGS. 1–1D, 2–2D, 3–3D, 4–4D, 5–5D, 6–6D provide a diagrammatic representation of an interface according to the present invention.
Figure 1B:
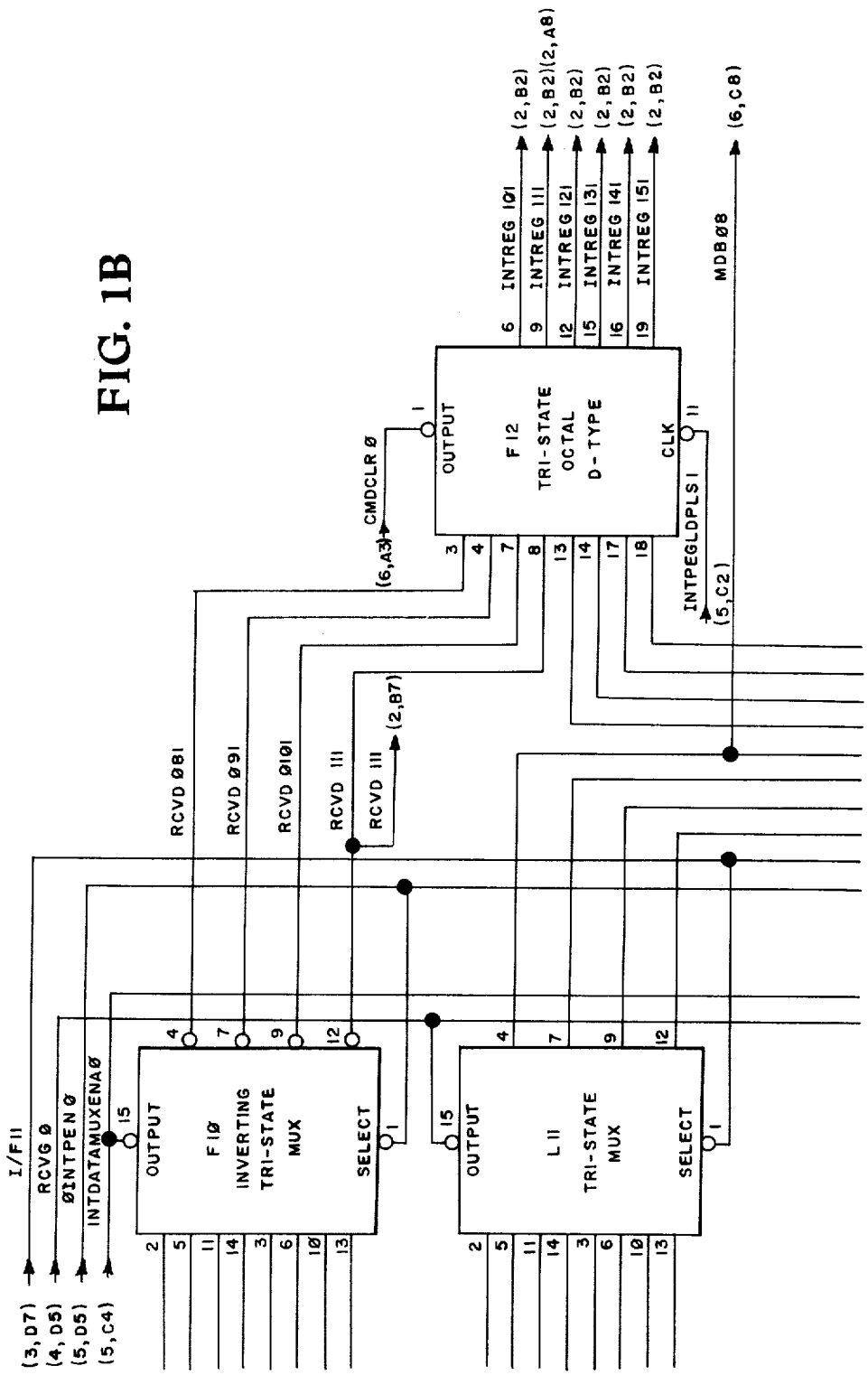
Figure 1C:
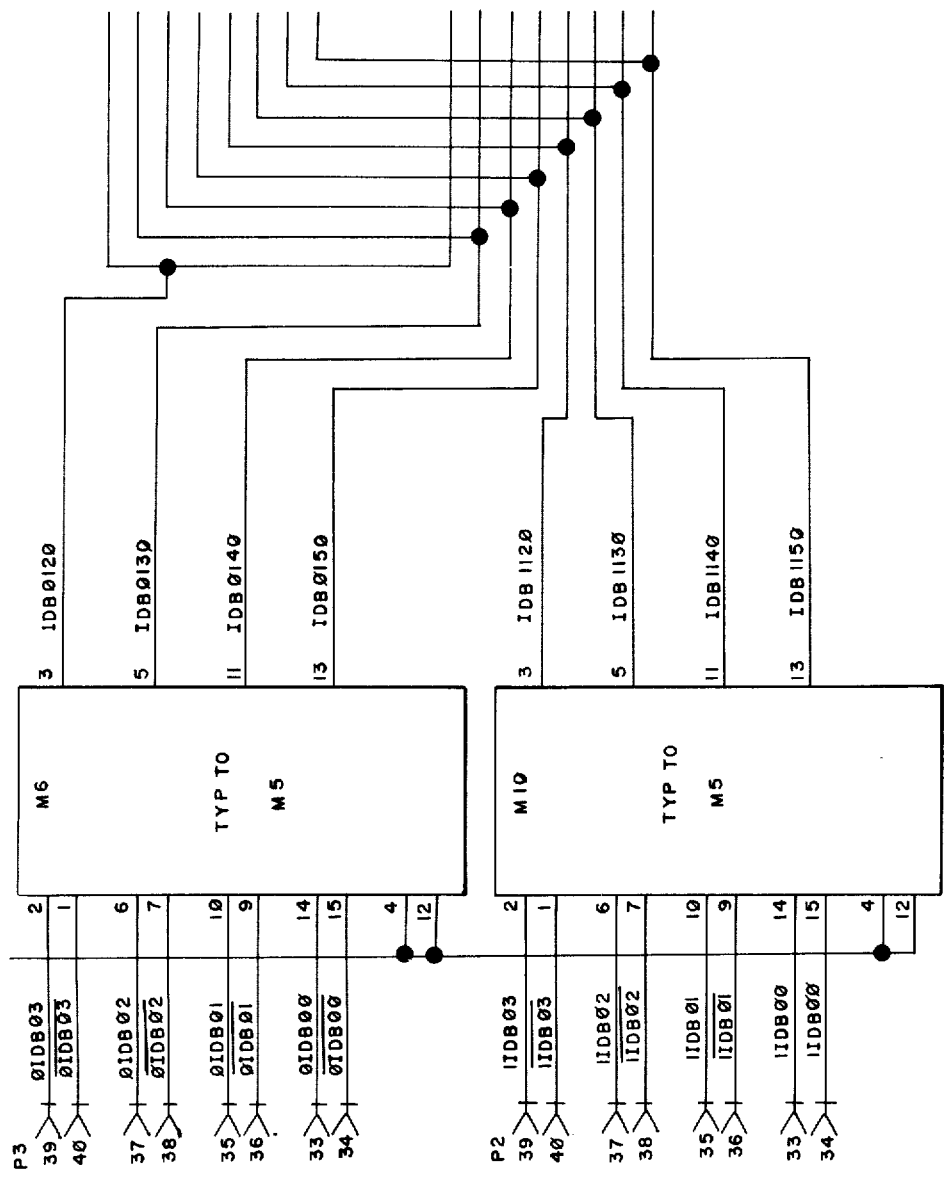

Referring now to the drawings, wherein like reference characters designate like or corresponding parts or signals throughout the several views, as can be seen from FIG. 1, the present invention can control two display generators from the controller. A display generator can include one or more keyboards and displays. Inputs are received from two separate ports (denoted 0 or 1) or sets of pin locations, one port per display generator, on the left side of FIGS. 1A and 1C. However, any number of ports or displays can be serviced if appropriate numbers of servicing components are utilized. To ensure that a chip failure on one driver-receiver section would not adversely effect the other driver-receiver section, two separate sets of circuits are utilized. Differential receivers M5 and M6 together are connected to receive eight-bit bytes or words of information from port 0 in differential form, and differential receivers M9 and M10 are connected to receive eight-bit bytes or words from port 1 in differential form. Differential receivers M5 and M9 each receive the four most significant bits of its respective byte, and differential receivers M6 and M10 each receive the four least significant bits of its respective byte. Each device M5, M6, M9 and M10 receives four bits in differential form on two lines per bit, and produces the four bits in binary form on one line each. Differential transmission between displays and interfaces reduces transmission errors, especially in electrically noisy environments, since any noise would affect both differential lines for any particular bit and so could be eliminated at the receiver.

To multiplex signals from all ports to a common bus, the four most significant bits from each port are provided to both tristate multiplexers F10 and L11, and the four least significant bits from each port are provided to tristate multiplexers F11 and L10. Two parity bits, OIDB00P0 and 1DB10P0 are for each port are provided to and are multiplexed by tristate inverting multiplexer L9. In the above-used signal notation which is also used in the drawings, the "0" final digit indicates a low-active signal while a "1" final digit indicates a high-active signal. The state of the parity bit indicates whether the received byte should have an odd or even number of ones. For data bytes, multiplexers L11 and L10 multiplex the byte onto middle data bus lines MDB08 to MDB15. These lines, and the multiplexed parity bit from L9, are received by 8-bit parity generator/checker L8 which compares the byte and parity bit for correspondence. When the display produces an interrupt signal for the computer, the display produces a status byte which is also multiplexed by F10 and F11 to tristate octal D-type interrupt register F12. This status byte indicates the type of or reason for the interrupt, and identifies the display generator (or portion thereof, if multiple) producing the interrupt.

Figure 3A:
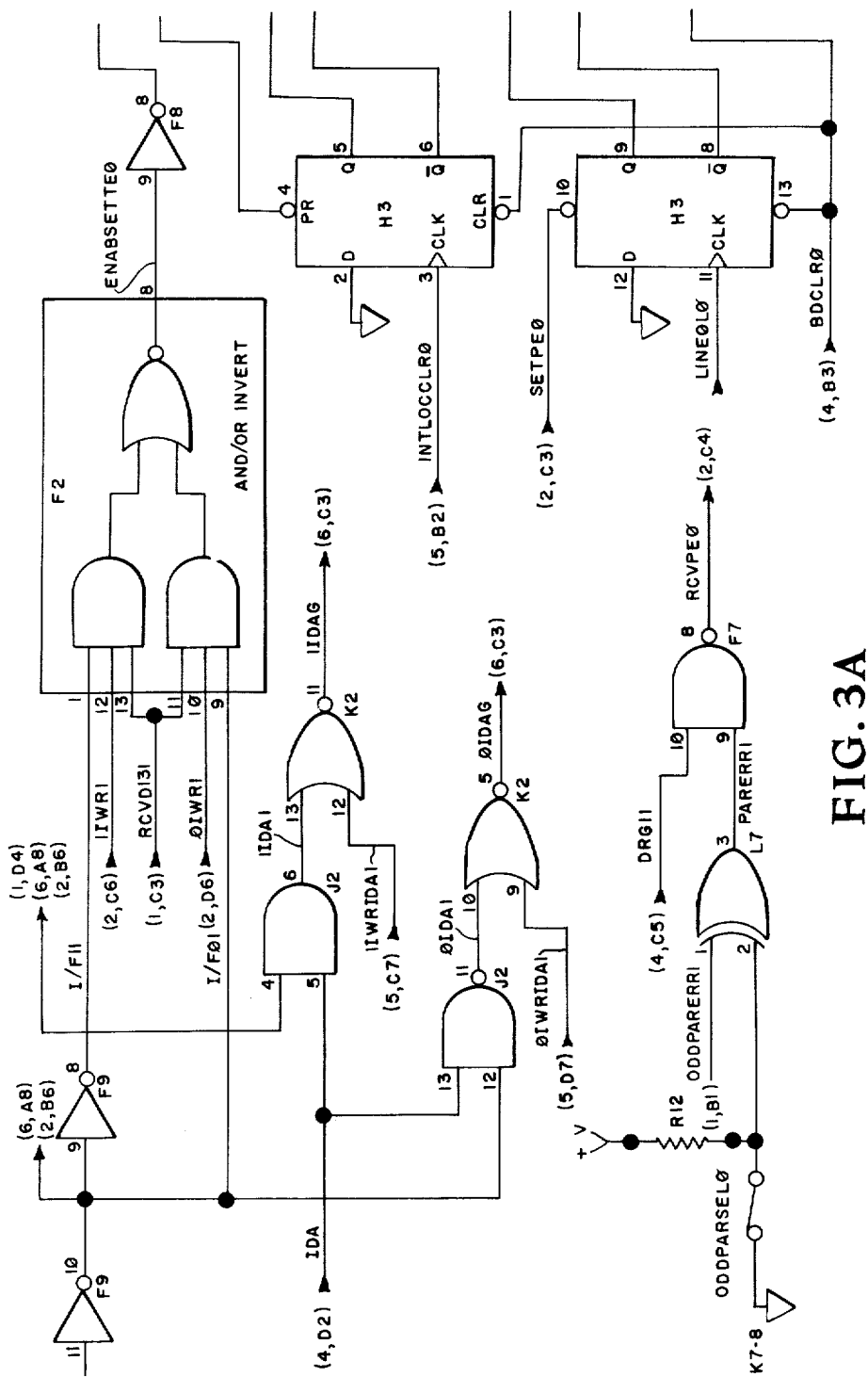
Figure 3B:
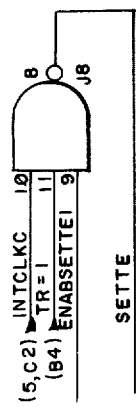
Figure 3B:
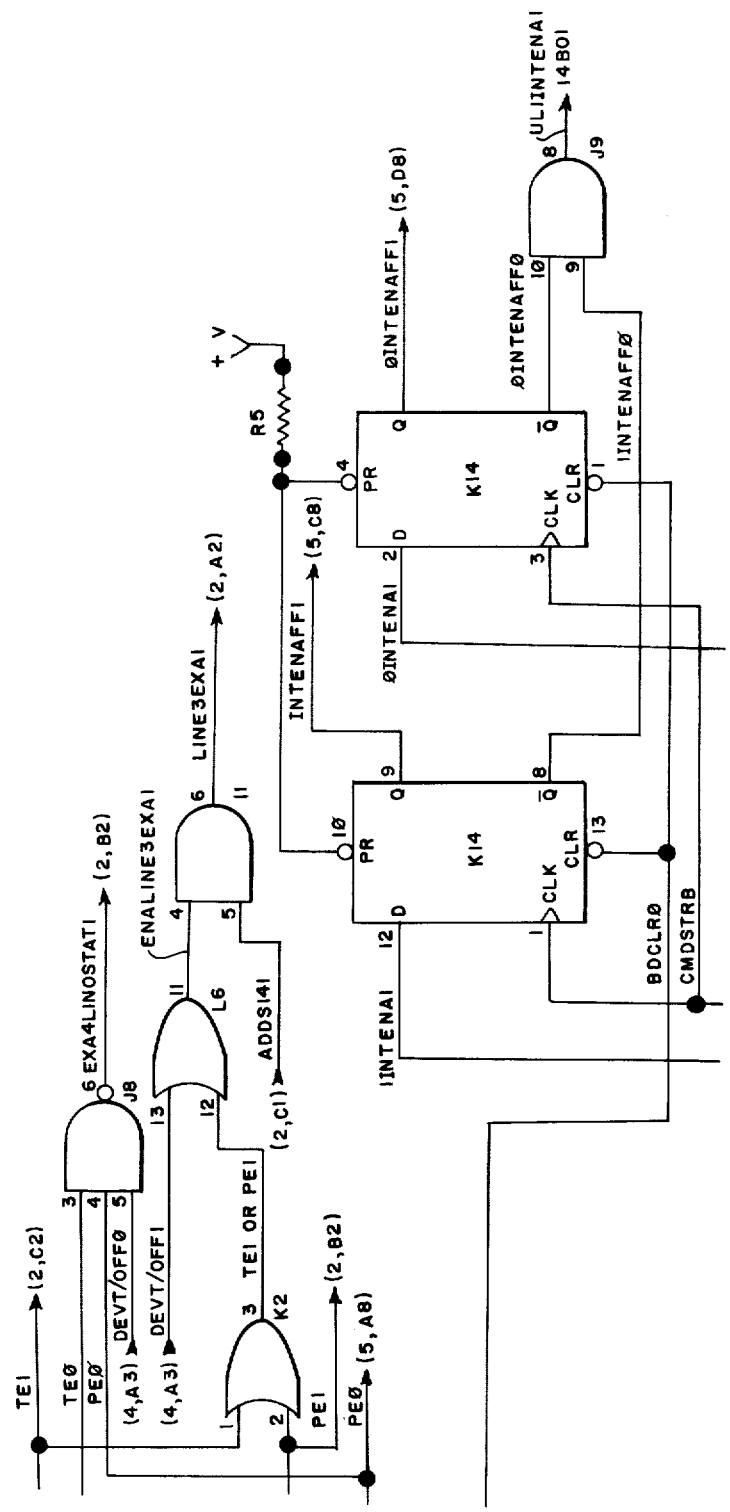
Figure 3C:
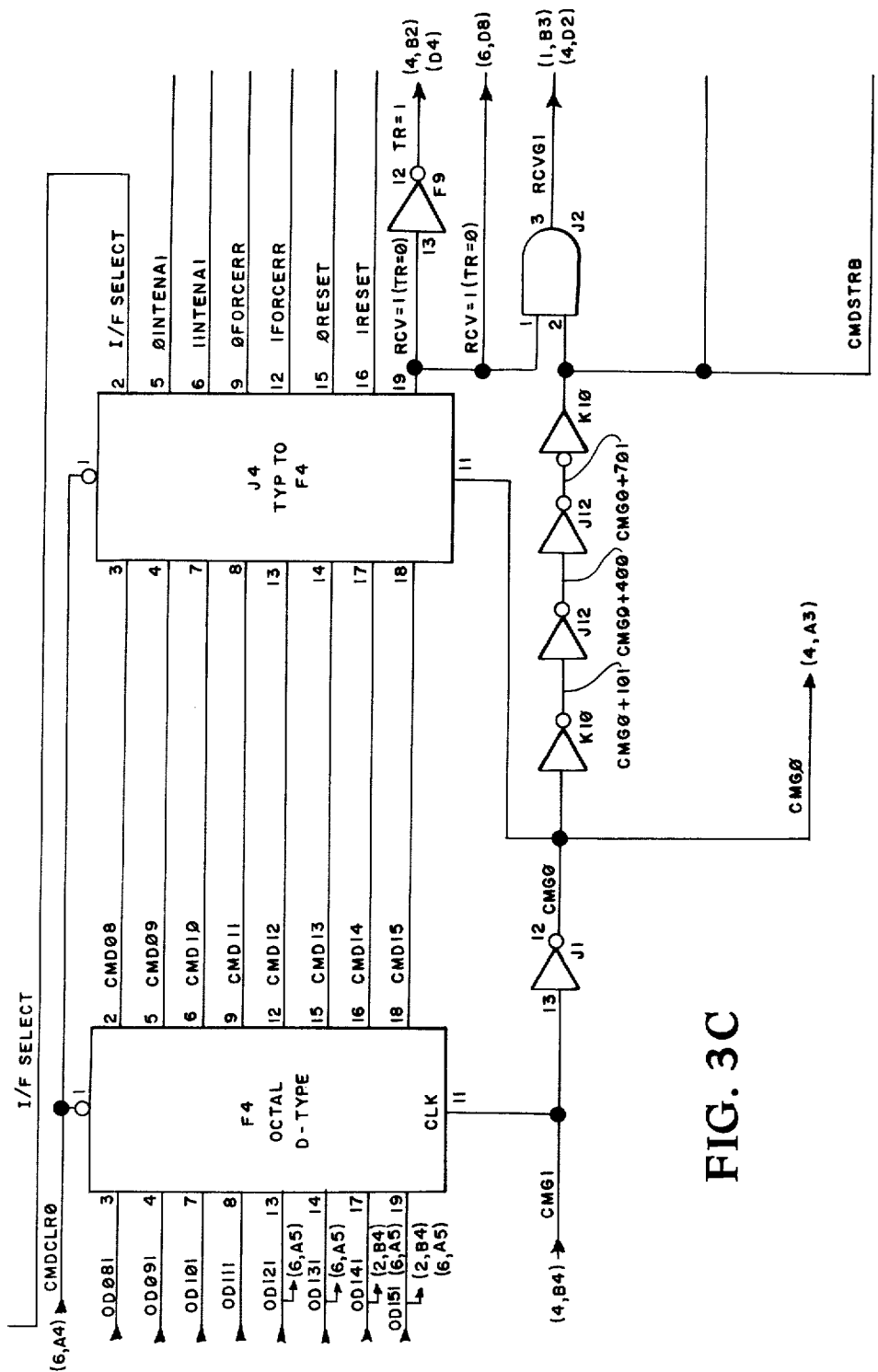

Interrupt and data handling are independent. Signal 0INTPEN0 (interrupt pending) from the system of FIG. 5 is provided to select pins F10-1 (meaning pin 1 of device F10) and F11-1 to select which port is to be multiplexed by multiplexers F10 and F11 to register F12. Signal I/F11 produced by the system of FIG. 3 (at FIG. 3A grid location D7) is provided to Select pins L11-1, L10-1 and L9-1 to select which port is to be multiplexed by multiplexers L11, L9 and L10 to parity generator/checker L8 and lines MDB08–15. Signal INTDATAMUXENA0 (interrupt data multiplexer enable) provided from the system of FIG. 5 (at FIG. 5A grid location C4) to Output pins F10-15 and F11-15 determines whether tristate multiplexers F10 and F11 have their outputs enabled to produce data, or instead have high-impedance output. Signal RCVG0 (received gated) provided from the system of FIG. 4 to Output pins L11-15, L10-15 and L9-15 performs a similar output enable/high-impedance output function for tristate multiplexers L11, L10 and L9.

As can be seen from FIG. 6, the present preferred embodiment of the present invention is capable of bidirectional transmission of data betwen display and computer. This capability, which reduces the amount of wiring and other components required, is partly due to the use of tristate devices with high-impedance output states. Lines MDB08-MDB15 from FIG. 1 are provided to quad bus transceivers H1 and H2. Data from the computer output data register appears on pins H1-2, H1-5, H1-11, H1-14, H2-2, H2-5, H2-11, and H2-14. Signal RCV=1(TR=0) (receive=1, transmit=0) from FIG. 3 is provided to pins H1-9 and H2-9 to control the direction of data flow on lines MDB08–MDB15. For this embodiment, if signal RCV=1 (TR=0) is high, then the data on lines MDB08–MDB15 from the display passes through devices H1 to H2 to lines ODB0-81–ODB151 to the computer which receives same. Without an ODR signal (discussed below) from this embodiment, the display will not accept data from differential drivers M1, M14, M2, or M15. Otherwise, the data from the computer appears on lines ODB0-81–ODB151 and MDB08–MDB15 are devices L9, L10 and L11 produce a high impedance output. Differential drivers M1, M14, M2 and M15 then provide the computer data to the appropriate display in differential form. Drivers M1 and M2 transmit to one port, such as port 0, and drivers M14 and M15 transmit to the other port, such as port 1. The data from the computer now appearing on lines MDB08–MDB15 is provided to parity generator/checker L8 of FIG. 1D which produces a parity bit signal on line MDB16. This signal is inverted and provided to differential drivers M13 and M3 for transmission in differential form to the display. Signal RCV=1 (TR=0) is provided by the computer to this embodiment as part of a command byte. Connectors P1 and P2 provide data to and from, respectively, a display, on port 0; connectors P4 and P3 provide data to and from, respectively a display, on port 1. Signal "XF"=$F_{16}$ is a command clear signal utilized to clear the interface, and is produced at pin K3-6.

Figure 2A:
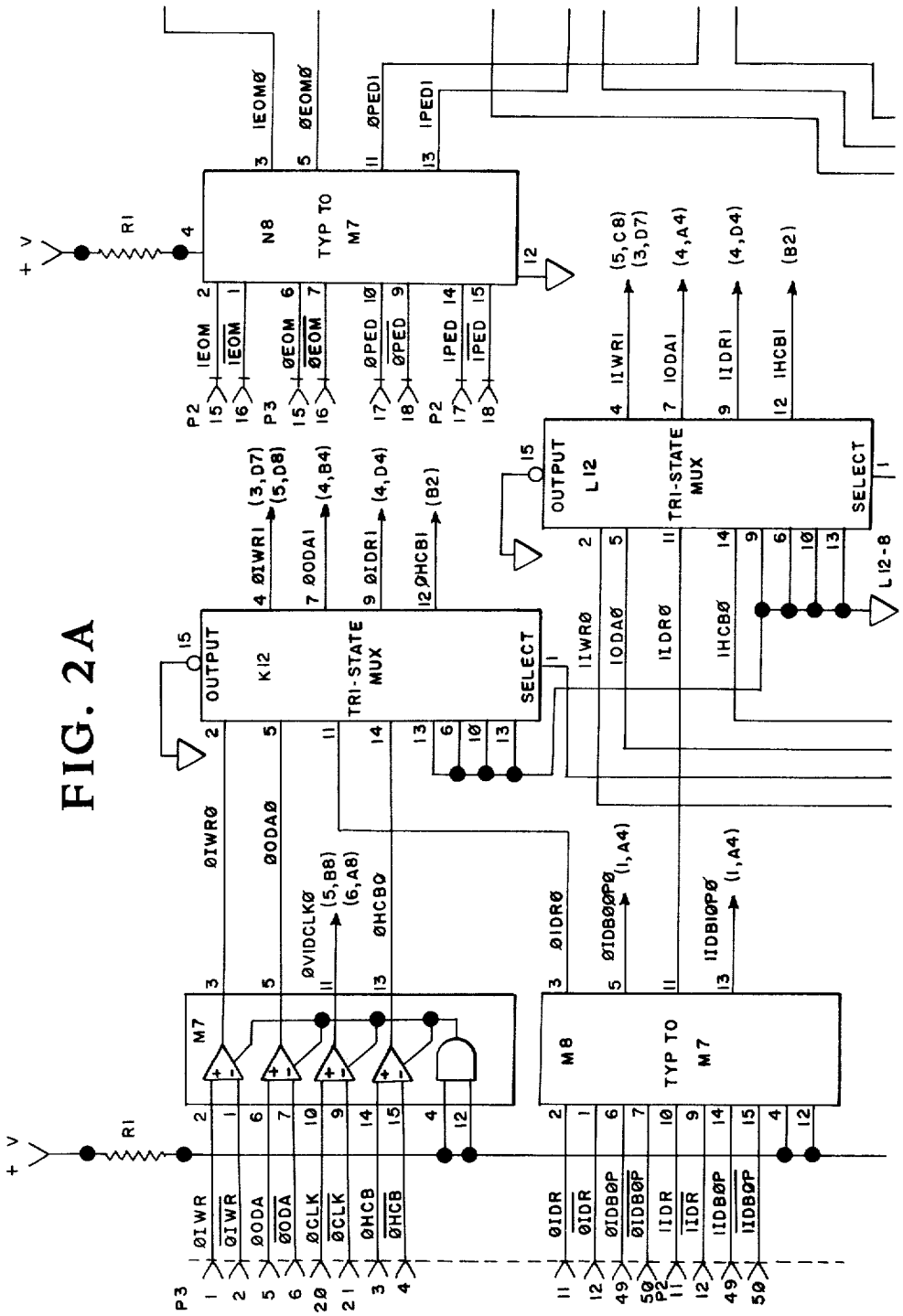
Figure 2C:
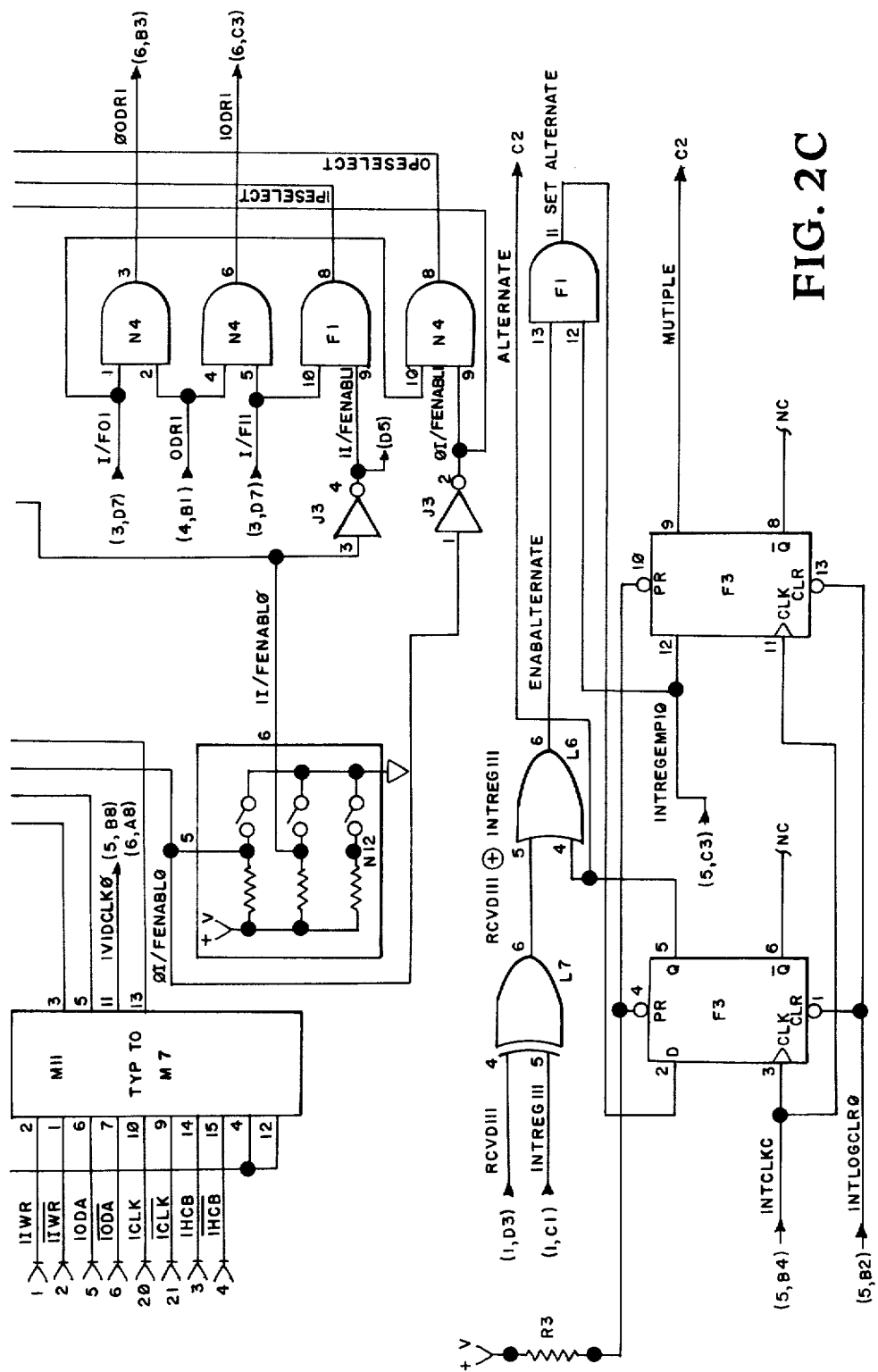
Figure 2D:
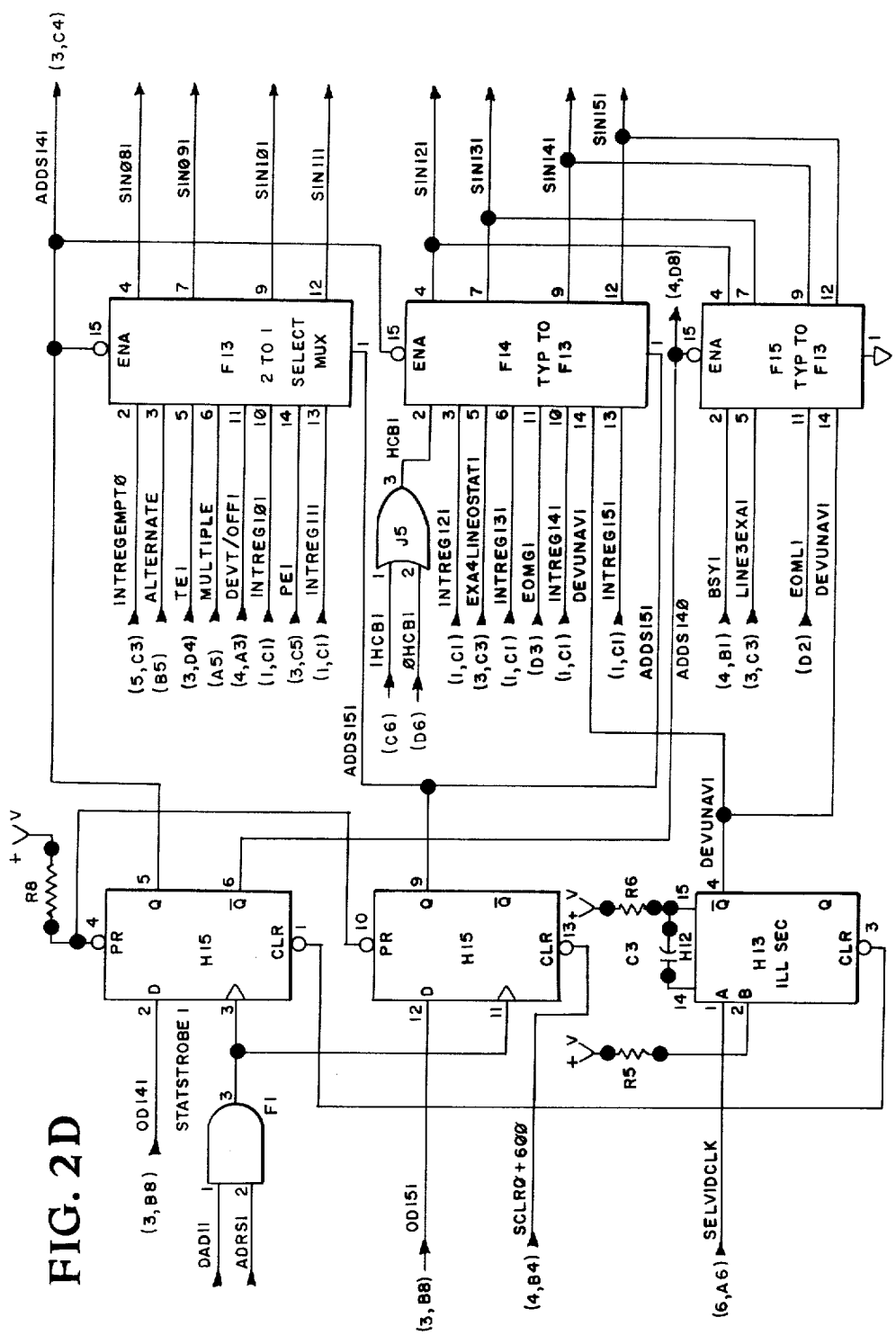
Figure 4A:
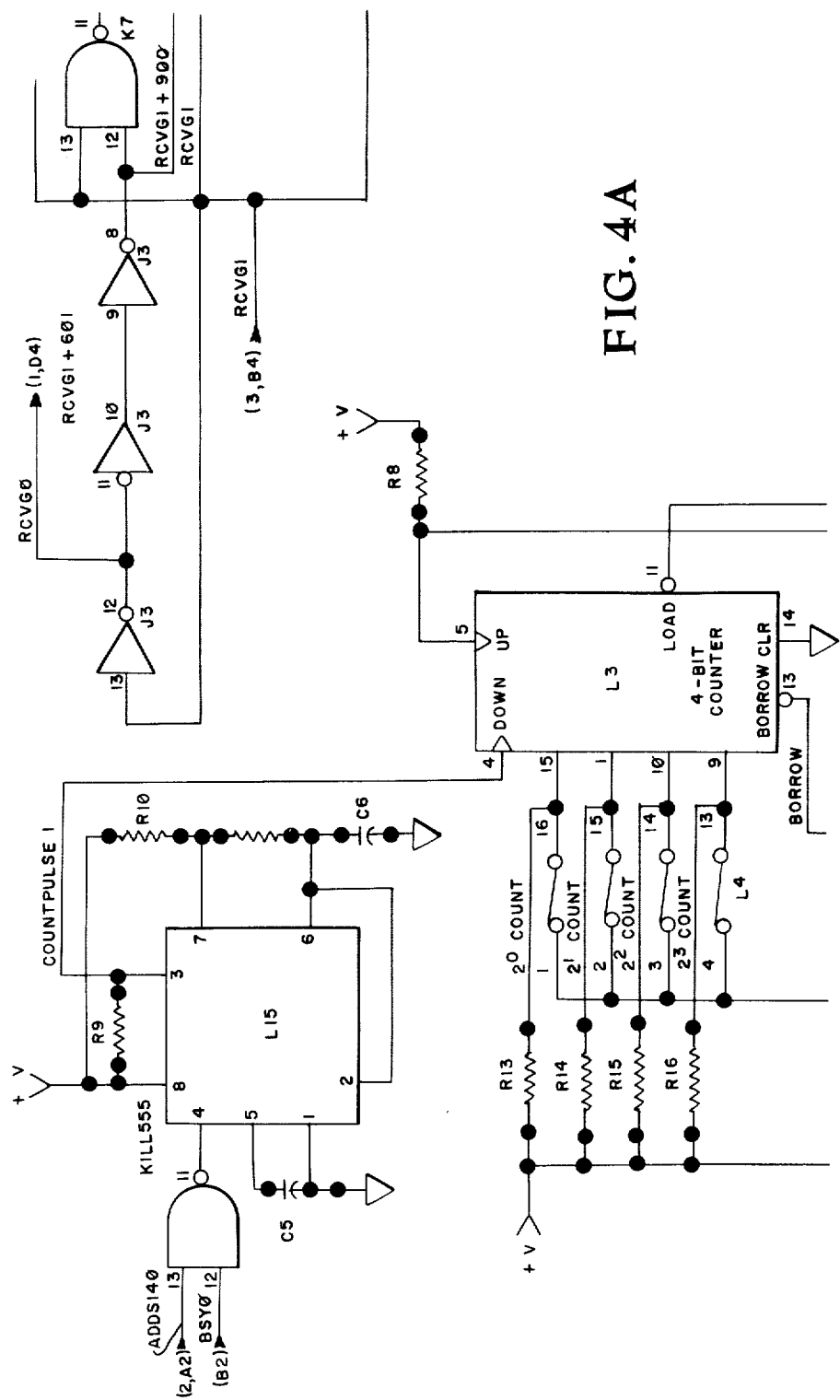
Figure 4B:
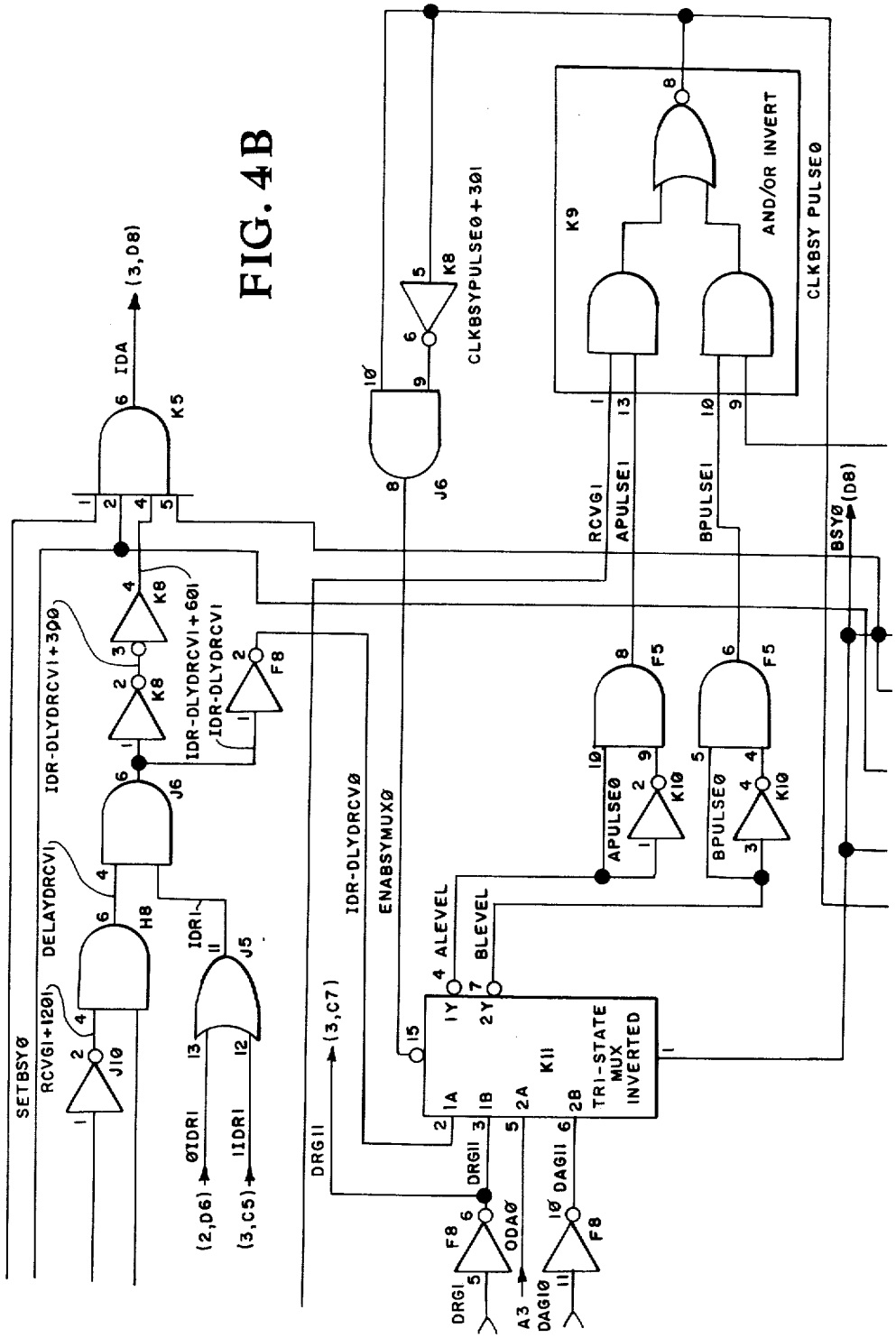
Figure 4C:
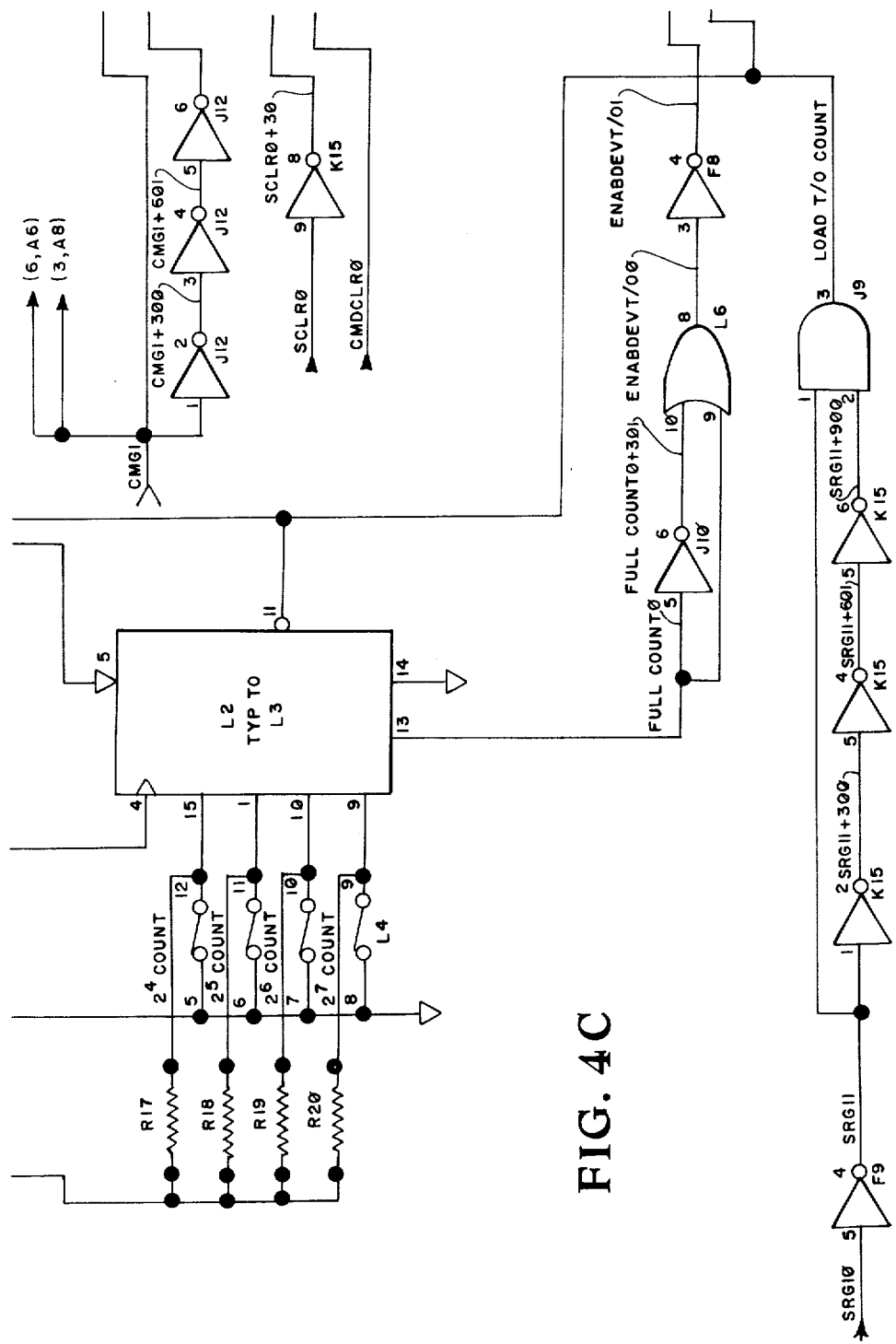
Figure 5B:
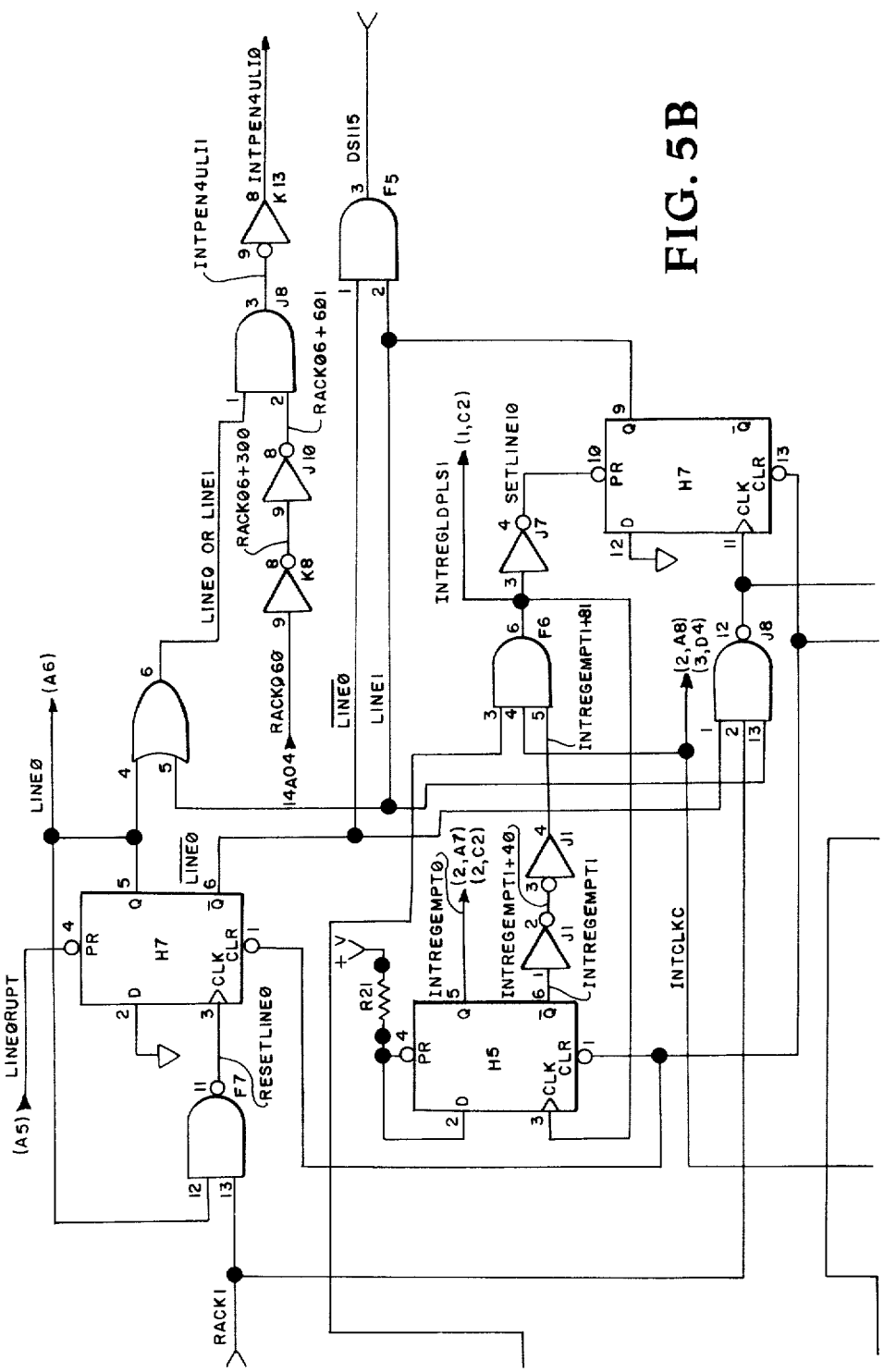
Figure 5C:
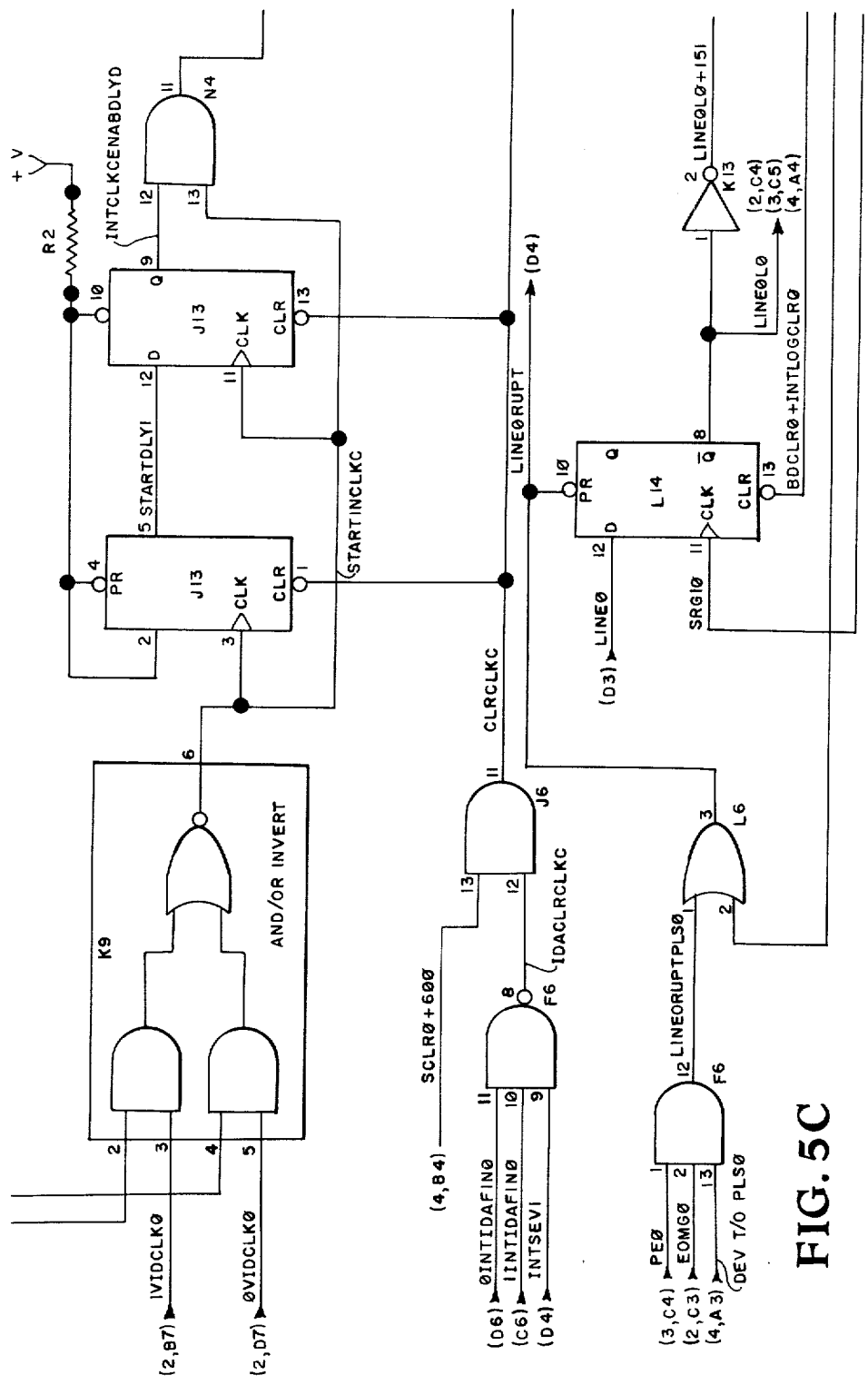
Figure 5D:
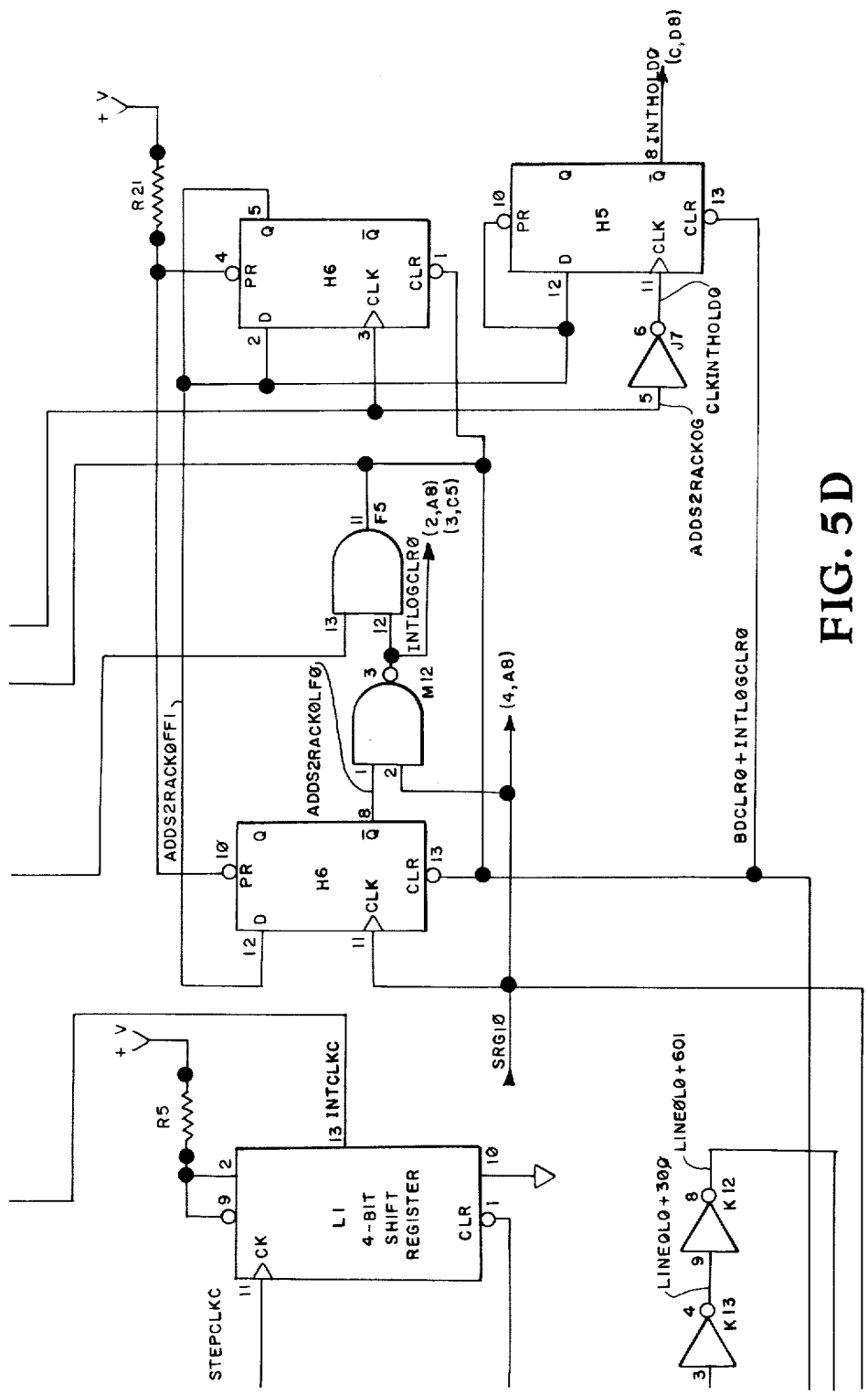
Figure 6D:
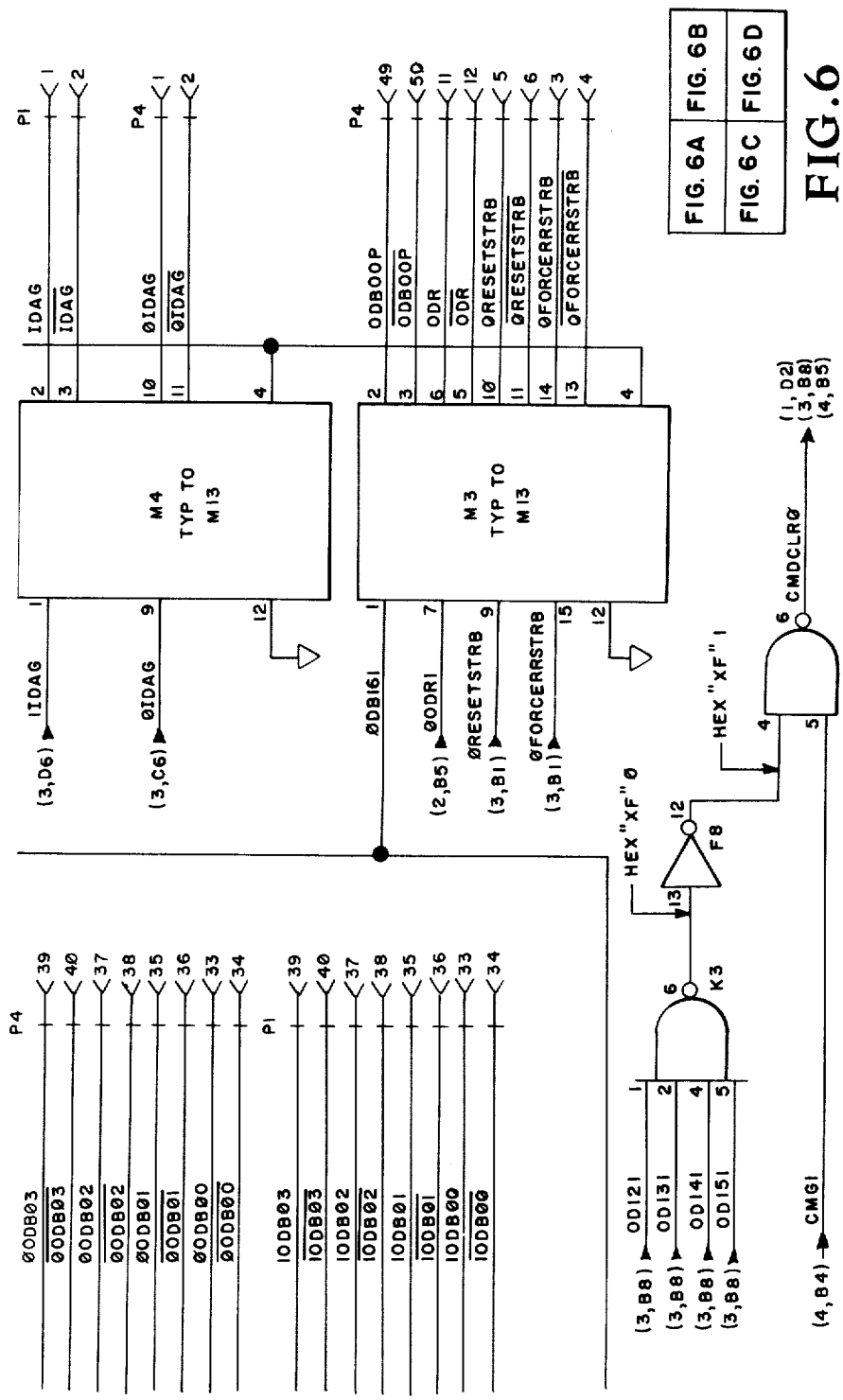
Figure 6A:
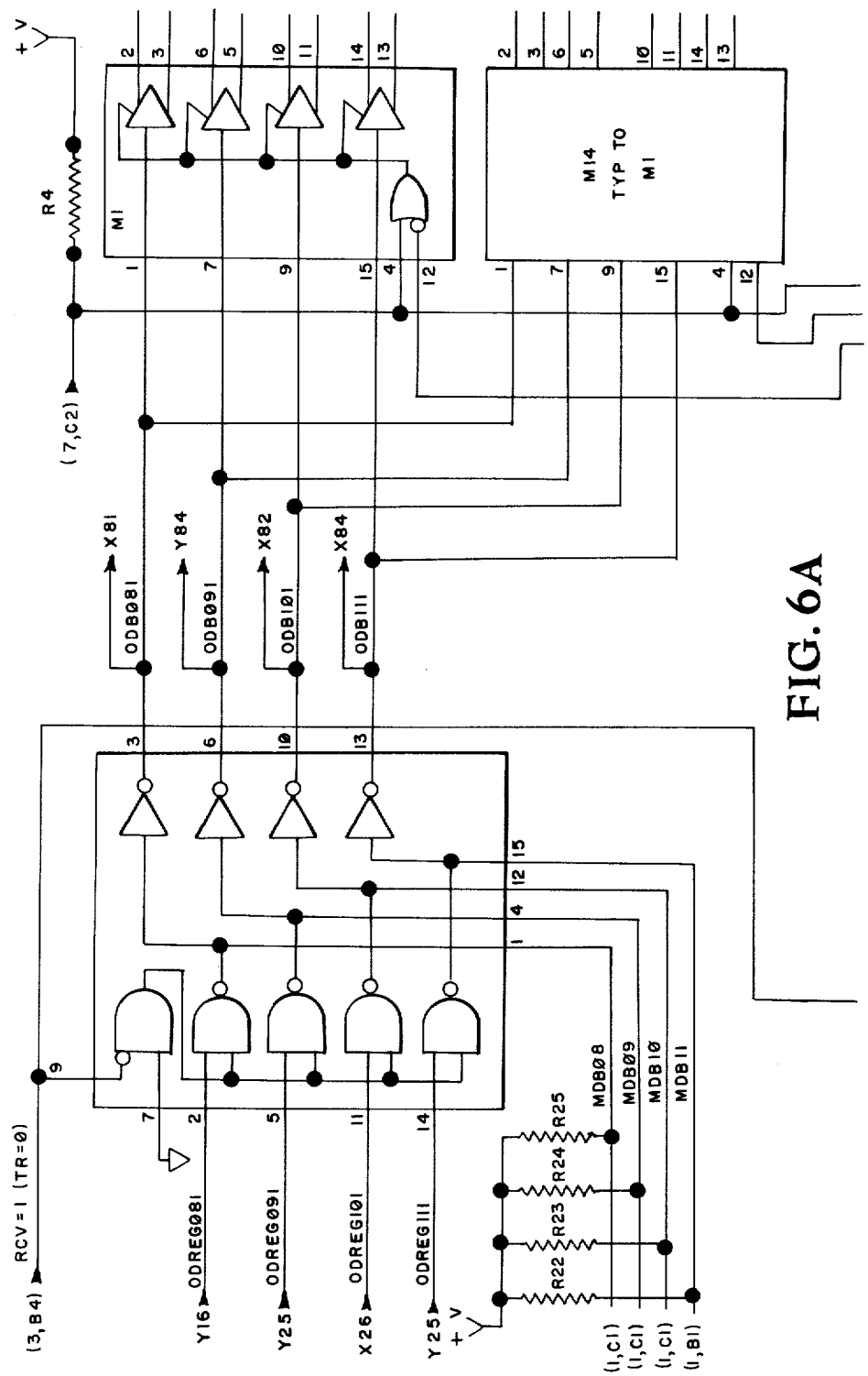
Figure 6B:
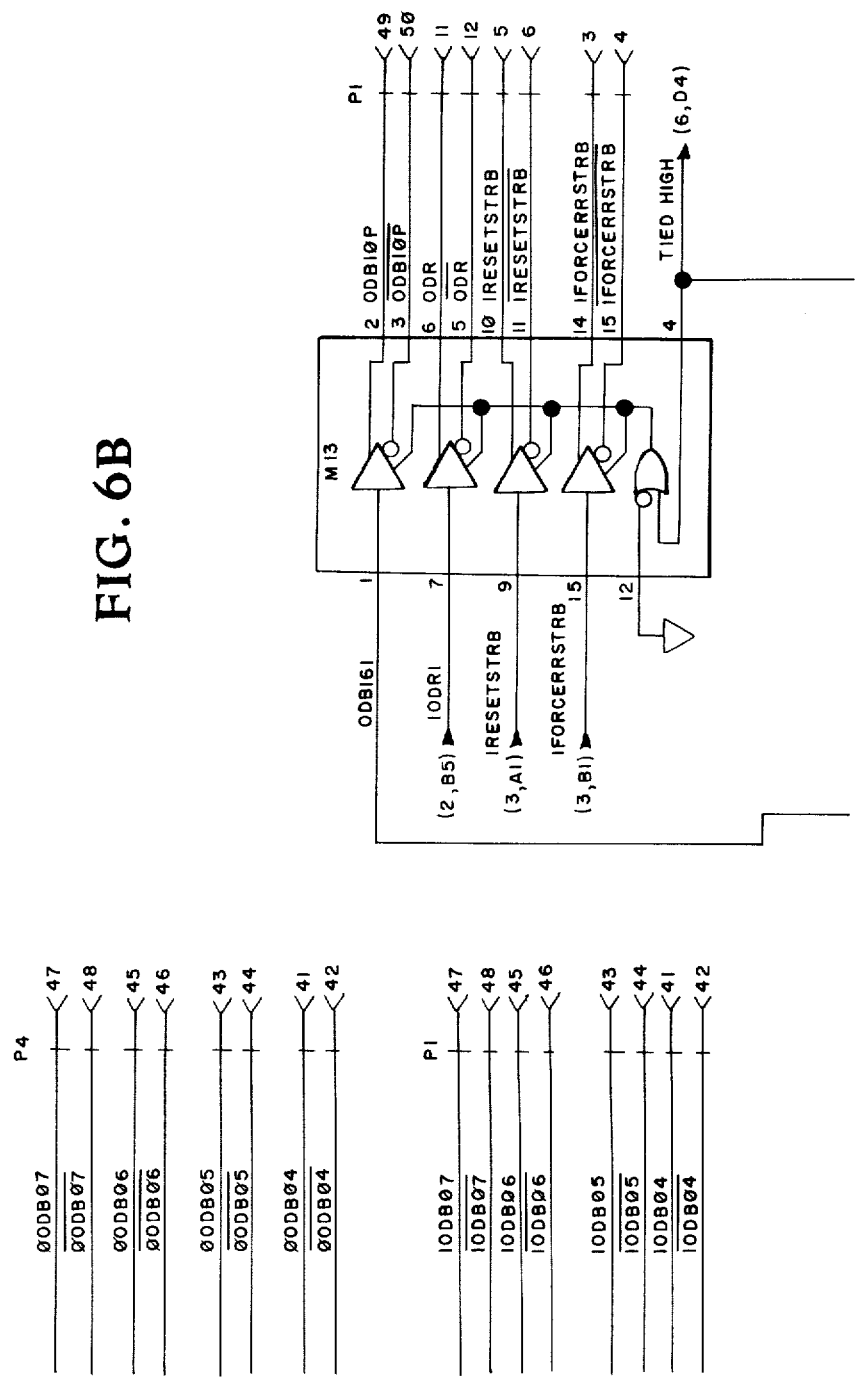
Figure 6C:
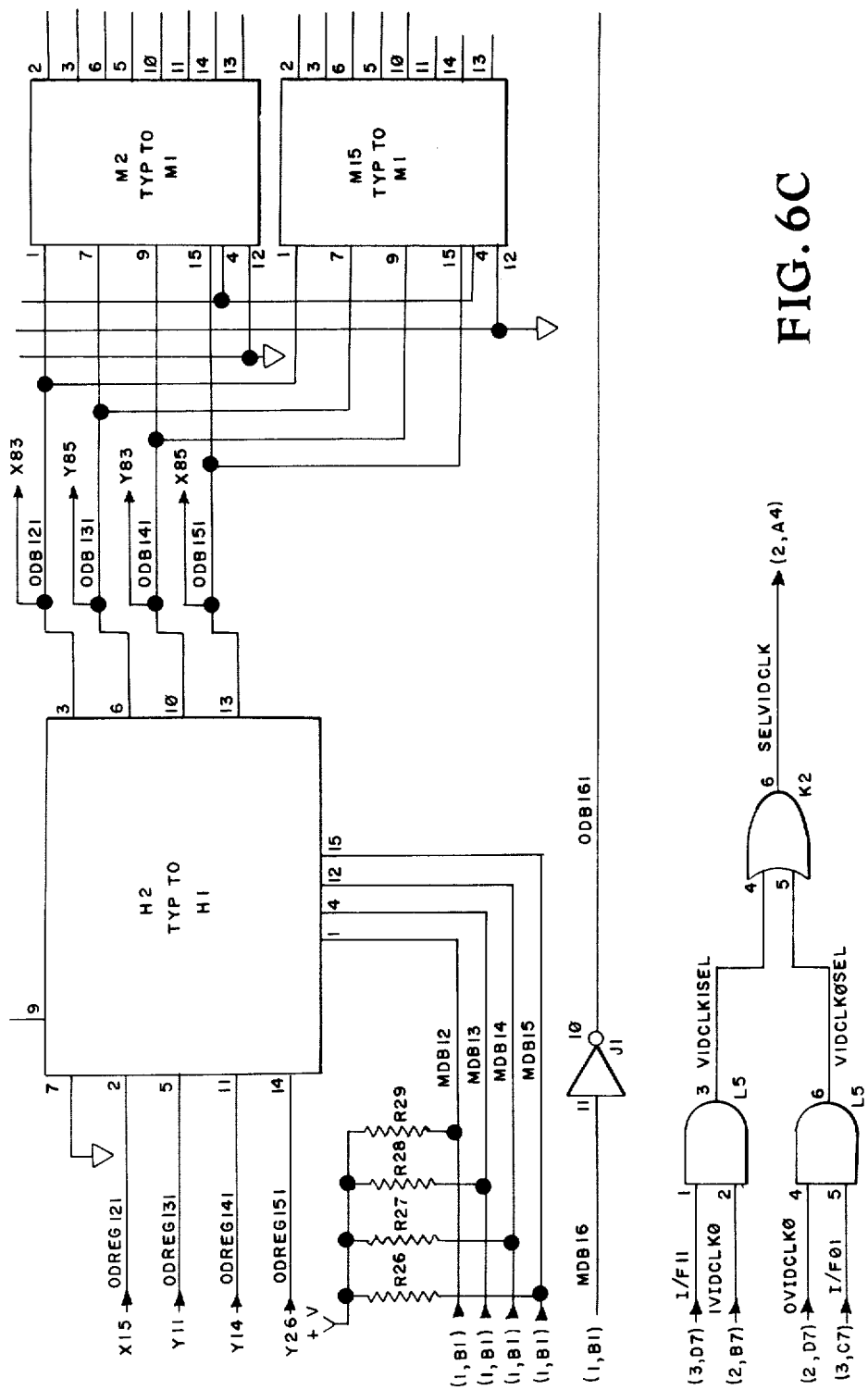

Referring now to FIG. 4, NAND gate M12 receives Signal ADDS 140 (Address 14) at pin 13 from the system of FIG. 2, and receives Signal BSY0 (Busy) at pin 12 from pin K6-6 as discussed, below. If either signal goes low (active), pin M12-11 produces a high signal which is provided to pin L15-4 and causes multivibrator or oscillator L15 to produce pulses (COUNTPULSE1) 1 millisecond apart at pin L15-3 for provision to pin L3-4. This occurs while data is ready to be, or is being, transmitted from the interface to a display generator. Switches L4 determine the initial value to be loaded into 4-bit counters L3 and L2. This initial value can be all one's. so that all switches L4 are open. COUNTPULSE 1 pulses cause counter L3 to count down from its initial value. Since Borrow pin L3-13 is connected to Down pin L2-4, counter L2 counts down also. This downcount or decrementing continues until data transmission is accomplished. If the initial load in counters L3 and L2 is all one's ($FF_{16}$), and if the display does not indicate that it is ready to receive data, as by producing a READ signal (which turns off ADDS 140), then the countdown continues for 256 milliseconds until the counters reach all zeros ($00_{16}$). If that happens, pin L2-13 produces a low FULL COUNT 0 signal which is provided to pins J10-5 and L6-9. Because pin L6-9 receives signal FULLCOUNT, while pin L6-10 receives signal FULLCOUNT following inversion and application of a 30 nanosecond delay by inverter J10, a 30-nanosecond low pulse is produced at pin L6-8. Since pin F7-1 then goes high for 30 nanoseconds, pin F7-3 goes low for 30 nanoseconds. Signal DEV T/0 PLS0 (device timeout pulse) produced at pin F7-3 presets timeout flipflop L14 and FIG. 5 line 0 flipflop H7 as well as FIG. 5 line 0 latch flipflop L14. A delay as substantial as 256 milliseconds in having the display generator respond indicates an error, and so an interrupt to so inform the computer is set up to examine address E0. Accordingly, address 14 is deselected, and pin M12-13 goes high, pin L15-4 goes low and multivibrator L15 is stopped.

Each status request SRG10 causes a 90 nanosecond LOAD T/0 COUNT pulse at J9-3. This pulse preloads counters L3 and L2 from switches L4.

In many cases, different devices, (such as the computer and a display) may have different speeds of operation. When data is to be provided from the computer via the present interface to a display, the display speed should be slaved to the interface speed. When data is provided from a display to the interface, the interface speed should be controlled by the display speed. In the latter situation, the present interface goes into receive mode due to a command byte to address E0 BSY0 goes low, and counters L3 and L2 begin decrementing. If the display does not respond within 256 milliseconds, L2 again causes preset of flipflops L14 (on FIG. 4), L14 (on FIG. 5), and H7 (on FIG. 5), and BSY0 goes high. Thus, ADDS 140 starts decrementing of counters L3 and L2 for transmission (to a display) mode, while BSY0 starts the decrementing for receive (from a display) mode.

If a device timeout does occur, then a signal CMDCLR0 (command clear) will have to be generated to cause a BDCLR0 (board clear) signal at pin L5-8 to clear the device timeout flipflop L14 (of FIG. 4). Signal SCLR0 (system clear) from the component enters the interface at pin K15-9. Signal SCLR0 passes through two inverters, both K15, which provides isolation protection to the computer in case of interface failure. Signal CMDCLR0 is produced by the system of FIG. 6 at pin K7-6) when an $XF_{16}$ command byte signal is received from the computer on lines OD121, OD131, OD141 and OD151, and a CMG1 signal is received from the computer. The $XF_{16}$ signal is produced by the computer in response to the address E0 interrupt generated when Signal DEV T/0 PLS0 causes preset of Line 0 flipflop H7 so that an active INTPEN4VLI0 signal is provided to the computer. Since pins L5-9 and L5-10 both receive low-active signals, the AND gate receiving these signals ORs the signals, producing a low-active BDCLR0 signal at pin L5-8 when either or both input signals SCLR0T600 (system clear delayed 60 nanoseconds) and CMDCLR0 are active. Signal BDCLR0 clears the entire interface. The device timeout flipflop L14 (of FIG. 4) also has its data input, pin L14-2, grounded, and its Clock input, pin L14-3, receiving signal LINE0L0 (Line 0 Latch) produced at Q pin L14-8 of FIG. 5. When line 0 latch L14 of FIG. 5 is cleared, signal LINE0L0 clocks and thus clears flipflop L14 of FIG. 4.

As shown in FIG. 4, the present invention provides handshaking for data transfers between the computer and any display generator. For transmission of data from the present interface to a display generator, the interface provides an active signal ODR (output data ready), to that display generator when the data to be transmitted is on the interface's output lines and is ready for transmission. In response, the display generator strobes in or receives the data, and provides to the interface a Signal ODA (output data acknowledge) pulse to return signal ODR to its normal, "inactive" state. For transmission of data from a display generator to the present interface and thence to the computer, that display generator provides signal IDR (input data ready) to the interface. In response, the present invention provides signal IDA (input data acknowledge) to cause signal IDR to return to its normal state. The "Busy" system accomplishing this handshaking includes "Busy" flipflop K6, tristate multiplexer K11, two pulse generators receiving signals from multiplexer K11, and AND/OR device K9.

Signal DRG1 (data request gated) provided from the computer to pin K11-3 indicates that the computer wants the interface to provide data. Signal DAG11 (data available gated) provided from the computer to pin K11-6 indicating that the computer has data to be provided to the interface and therefrom, to a display generator. Signals 0ODA1 from port 0 and 1ODA1 from port 1 are combined by OR gate J5 at pin J5-8 and inverted to produce composite signal ODA0 at pin J7-8 which is provided to pin K11-5. When data is received from a display generator, an IDR signal is provided at the same time as is the data byte. This data is provided to the computer by the DRG signal. Signal CMG1 in FIG. 3 is inverted at J1-12 to CMG0 and combined with signal RCV=1 (TR=0) at AND gate J2 to produce signal RCVG1 (receive gated) at pin J2-3. Signal RCVG1 when active indicates that the interface is Receive mode. Signal RCVG1 at its active level indicates Receive Mode. Signal RCVG1 is provided to pins K9-1, K5-1, H8-5, K7-13, and J3-13, and when active sets these pins high. The three J3 inverters between pins J3-13 and K7-12 apply a 90-nanosecond delay to inverted signal RCV60 there so that pin K7-11 produces a 90 nanosecond low pulse as signal SETBSY0 which is provided to pin K6-4 to preset initially cleared Busy flipflop K6. Signal SETBSY0 then returns high to set pin K5-2 high. Inverter pin J10-2 is normally low. The delayed inverted low active signal provided to pin K7-12 is also received, inverted and delayed, to a total delay of 120 nanoseconds, by inverter J10. After this delay, normally low pins H8-6, and thus J6-4, go high.

When a display generator starts providing data, an IDR signal is provided on its port, with each data byte. The port 0IDR1 and port 1 1IDR1 signals are combined at OR gate output pin J5-11 so that the IDR signal appears as high active composite signal IDR1 at pin J6-5. When pins J6-4 and J6-5 are both high, AND gate output pin J6-6 goes high. Following a 60 nanosecond delay by inverters K8, high pin J6-6 sets pin K5-4 high. Preset Busy flipflop K6 sets pins K6-5 and K5-5 high. When pins K5-1, K5-2, K5-4 and K5-5 are high, the data byte accompanying the active IDR signal has been received, by the present interface, and AND gate output pin K5-6 goes high, producing the IDA signal for the transmitting display generator.

The Busy system utilizes signal BSY0 produced at the $\overline{Q}$ output, pin K6-6, of Busy flipflop K6 as the select signal (input pin K11-1) of multiplexer K11. A low BSY0 signal (produced by a set or present Busy flipflop K6) causes multiplexer K11 to pass the 1A and 2A signals to locations 1Y (pin k11-4) and 2y(pin K11-7) respectively. The modified high active IDR signal at pin J6-6 is inverted by inverter F8 at pin F8-2 to provide a low active modified IDR signal to pin K11-2 of multiplexer K11. Accordingly, after an IDR signal is received, a high signal appears at normally low output pin K11-4 of multiplexer K11. Since pin K11-4 is normally low, pin K10-2 is normally high, and remains so for about 10 nanoseconds after pin K11-4 goes high. Since the signal from pin K11-4 is provided to pins F5-10 and K10-1, and since the signal from pin K10-2 is provided to pin F5-9, AND gate output pin F5-8 produces a high pulse for 10 nanoseconds as signal APULSE1. This pulse is provided to pin K9-13 of AND/OR INVERT K9. Since Signal RCVG1 now holds pin K9-1 high, the signals applied to pins K9-1 and K9-13 are ANDed and inverted so RCVG1 output pin K9-8 produces a low pulse of approximately 10 nanoseconds duration as signal CLKBSY PULSE0 (clock busy pulse). This low pulse is provided to Clock pin K6-3 of Busy flipflop K6. Since Data pin K6-2 receives the $\overline{Q}$ output (signal BSY0) from pin K6-2, application of the pulse from pin 9-8 causes flipflop K6 to toggle or change state. Since for this discussion flipflop K6 has been set to permit the production of signal IDA, this flipflop is now reset, so that signal BSY1 goes low and signal BSY0 goes high. A JK or trigger flipflop could alternatively be used as K6. Since signal BSY0 is now high, multiplexer K11 now multiplexes its 1B and 2B inputs (at pins K11-3 and K11-6, respectively) to respective outputs 1Y (pin K11-4) and 2Y (pin K11-7). When a Data Request is received from the computer, normally high pin K11-3 goes low, producing a high signal at normally low pin K11-4. Since pin K11-4 is normally low, inverter output pin K10-2 and thus AND gate input pin F5-9, is initially high. When multiplexer K11 receives and provides the active DRG signal to input pins K10-1 and F5-10, approximately 10 nanosecond duration high pulse is produced at F5-8 as signal APULSE1. This pulse appears at pin K9-8 as a low pulse of equal duration which clocks flipflop K6 to set from reset. The interface, in response to signal DRG, is now preparing to transmit data to the computer, which data has just been received from a display generator. Thus data can be transmitted from a display generator to a computer having different speeds without loss of data due to the difference in speeds. For receive mode, signal TR=1 and thus pin K9-9 are low, so the output at pin K9-8 is not affected by any signal received at pin K9-10. Pins K9-1 and K9-13 are used for receive mode.

Inverter K8 and AND gate J6 receiving signal CLKBSY PULSE0 provide additional protection to the Bysy system, but can be deleted if so desired. These devices provide to Enable pin K11-15 a high pulse of 10 nanoseconds duration as signal ENABSYMUX0. This pulse disables the outputs of tristate multiplexer K11 while flipflop K6 is being clocked to switch states, which changes the select signal to pin K11-1. Thus, only high-impedance outputs are produced by multiplexer K11 while it switches between its A and B inputs for its output signals.

For transmit mode, the computer provides an active DAG signal to inverter input pin F8-11. Multiplexer signal input pin K11-6 is normally low, since pin F8-11 is normally held high by signal DAG10. For transmit mode, a transmit command byte is provided to the interface from the computer. This byte clears flipflop K6 to reset. Accordingly, multiplexer K11 provides its 1B and 2B inputs (respective pins K11-3 and K11-6) to respective outputs 1Y and 2Y (respective pins K11-4 and K11-7). Output pin K11-7 is then normally high, as are AND gate input pin F5-5 and inverter input pin K10-3, so inverter output pin K10-4 and AND gate output pin F5-6 are normally low. When an active DAG computer signal is received, pin F8-11 goes low, pins F8-10 and K11-6 go high, and pins K11-7, F5-5 and K10-3 go low. Because of the delay imposed by inverter K10, AND gate output pin F5-6 produces a 10 nanosecond duration high level pulse to pin K9-10 as Signal BPULSE1. Thus, each K10-F5 inverter—AND gate pair connected to multiplexer K11 serves as a one-shot pulse generator. Since in transmit mode Signal TR-1 is high, holding pin K9-9 high, a high pulse applied to pin K9-10 causes production of a low clock busy pulse at pin K9-8 to clock flipflop K6 to set. The 1A and 2A inputs are now selected on multiplexer K11.

In transmit mode, the computer makes its transmitted data byte available to the interface, and provides an active DAG signal to the interface, while that data is available to transfer the data to the interface. Flipflop K6 is then set, by a clock busy pulse, as discussed in the preceding paragraph. Setting of flipflop K6 indicates that the data byte from the computer is now on the interface output lines. Signal BSY1 now becomes high, so AND gate input on K5-13 goes high. Signal TR=1 and thus pin K5-12 are high in transmit mode. No ODA signal has yet been provided by the intended display generator to the interface, since no active ODR signal has yet been provided to that display generator from the interface. Since a display generator acknowledges an ODR with an ODA, no ODA can be present until after the ODR is generated. Pins K5-9 and K5-10 are thus high. Accordingly, when flipflop K6 is set, AND gate K5 produces an active signal ODR1 at output pin K5-8, since all inputs K5-9, K5-10, K5-12 and K5-13 are then high. Other circuitry in the interface, shown in the drawings, selects the proper port. The selected display receives the ODR from the interface, reads in the data from the interface, and provides an ODA to the interface. The ODR signal remains active until the ODA signal is received, thereby providing positive handshaking between interface and display generator. Signal 0ODA1 from port 0 is provided to OR gate input pin J5-10, and signal 1ODA1 from port 1 is provided to OR gate input pin J5-9. Setting of flipflop K6 causes multiplexer K11 to select its 1A and 2A inputs for outputting at its 1Y and 2Y outputs, respectively. A high ODA1 signal from either port, passing through OR gate J5, and inverter J7, is provided as signal ODA0 to input 2A of multiplexer K11 at pin K11-5. Signal BLEVEL at output pin K11-7 then goes high, as does AND gate input pin F5-5. The approximately 10 nanosecond delay caused by inverter K10 causes pin K10-4 to remain high for approximately 10 nanoseconds. AND gate output pin F5-6 thus produces an approximately 10 nanosecond high pulse. Since signal TR=1 is active and high in transmit mode, AND/OR INVERT device K9 converts the high pulse from pin F5-6 to a low pulse. Since flipflop K6 need no longer be set and active, this low pulse as signal CLKBSY PULSE0 clocks flipflop K6 to reset. Before the ODA is received, pins J5-9 and J5-10 are low, so pin J5-8 is low, pin J7-8 (signal ODA0) is high, pin K8-12 is low, pin K8-10 is high, pins K5-9 and K5-10 are high, and pin K5-8 and signal ODR1 can remain high. When a high ODA1 is received from either port, pin OR gate output pin J5-8 goes high, inverter output pin J7-8 goes low, inverter output pin K8-12 goes high, and inverter output pin K8-10 goes low, forcing low AND gate input pins K5-9 and K5-10 and thus signal ODR1. Thus, in response to the computer's DAG data available signal, data was transmitted from the computer to the interface, flipflop K6 was set, signal ODR was generated and provided to the appropriate display generator to strobe the data thereto, and signal ODA was received to reset flipflop K6, return multiplexer (MUX) K11 to its "B" select to receive another DAG signal, and remove the ODR signal. Again, positive handshaking for data transfer between computer and interface, and between interface and a peripheral or data handling device is provided, and problems involved in transfer of data between devices of different speeds are avoided, to prevent slop, loss of data and other errors in the system. Since the interface handles data transfers with each device at that device's speed, problems resulting from different device speeds are avoided.

Each command byte from the computer to the interface is accomplished by a high signal CMG1 (command gate). Receipt of this high signal at inverter input pin J12-1 and at NAND gate input pin K7-10 results in production of a 90 nanosecond low pulse at NAND gate output K7-8. This low pulse is provided as signal CMDCLRBSY0 to pin K6-1 to clear BSY flipflop K6. Signal SCLR0 is also connected, via AND gate input pin L5-12, to clear flipflop K6.

In the embodiment described herein, device address E0 is used by computer 13 to command interface 11, and to receive the interface's status. Device address E1 is used to receive interrupts from display generator or other device 15. Address E2 (and/or E3) is used by the computer 13 to communicate with a display generator or other device 15. These computer 13 device addresses permit the computer to communicate with these different functions. When address E2 or E3 is used, ADDS 140 will be true or active.

This embodiment of the present invention can provide interfacing and intercommunication, such as for transfer of data or signals or other communication, between a Perkin-Elmer Systems Interdata 8/32 Intelligent Controller computer and Aydin Controls Display Generators such as the Aydin 5215. An MDB Universal Logic Interface can be used to connect the present embodiment to the Interdata 8/32. Some terms used herein regarding external signal designations and byte formats and format designations are those utilized for these devices. For example, see *Aydin 5215 Training Manual* No. 150-6040-008. However, it should be understood that the present invention can be utilized with other computers or controllers than the Interdata 8/32, and can be utilized with other peripherals and data handling devices than the Aydin Controls Display Generator. Also, the present invention can be used with other interfaces than the MDB Universal Logic interface, or without any such additional interfacing. Adaptation of the embodiment described herein is of course, easier if the format and signal requirements of the above devices, and the devices to be interfaced, are similar.

Figure 7:
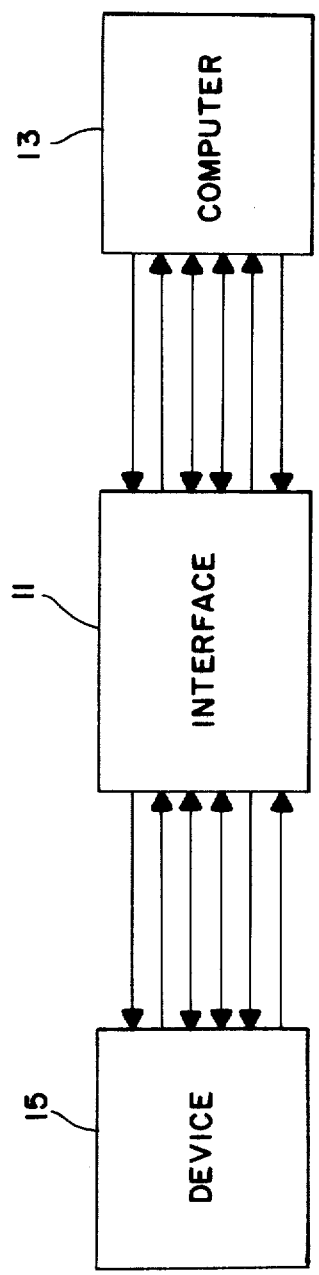
FIG. 7 is a block diagram showing an interface according to the present invention being utilized to interface a computer and a device.

Such as is shown in FIG. 7, the interface of the present invention 11 can provide interfacing between a computer or controller 13 and one (or more) peripherals or data handling devices 15 such as a keyboard with CRT display. The interface 11 can provide transfer of data, interrupts and other signals, and other intercommunication, between computer 13 and device 15.

The present invention provides rapid, reliable interfacing, with reduced downtime.

Initially, such as at power up, the computer or a user of the computer will call for a master clear of the overall system. A low SCLR00 system clear signal is then provided to the present interface. This signal starts a process in which the address flops are cleared to $00_2$ ('$E0_{16}$') , the status flops are cleared, the interrupt circuitry is reset and the BSY flop is cleared.

Using $E0_{16}$, $E1_{16}$, and $E2_{16}$ for Device Addresses on the Interface if the computer interrogates the status of address 'E0', it will be provided with a status byte having the following format:

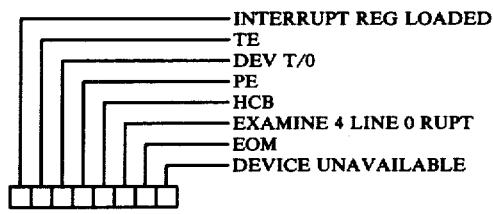

A logical '1' in any bit position can be a true state (i.e., an '01' byte indicates a Device Unavailable condition).

The present embodiment requires a command byte to set up for conversing with a display generator, port selection (there are two ports on the board, '0' or '1'), enabling interrupts, and both hard and soft initialization of the display generators. The command byte is sent out from the computer in the following format:

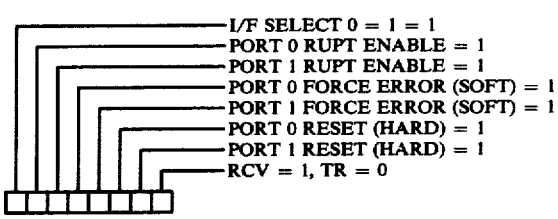

Also, a command byte of '$XF_{16}$', wherein the four most significant bits are "don't care" and the four least significant bits are all ones, will cause a Command Clear of the interface board. This is to enable clearing the interface to a lesser extent than an SCLR0.

If the computer interrogates or senses the status of device "E1", the present embodiment provides to the computer a status byte of this format:

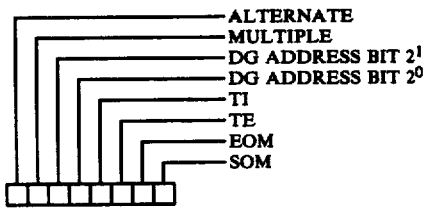

The six least significant bits are provided by the display generator. At this time the two other addresses (E2 and E3) will give the same status byte no matter which address is statused. This status byte is mainly for the benefit of transfers via direct memory access. These bits are aligned so as to provide positive feedback for direct memory access. This byte is configured for devices under direct memory access in the following format:

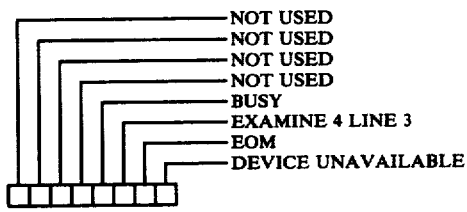

To transmit data from the computer to a display generator on Port '0', a command byte of '60' is sent to the interface. This byte is first latched into a '273 octal D-type flop at F4 By CMG1. With the fall of CMG1 the output of J1-12 will go high, strobing into J4 the command byte sent from the processor. The H4 location should be replaced with direct wire-to-wire connections to continue the bus.

F4-1 will be low with this command. This low is seen on F9-11. The signal at F9-10 will go high making I/F 01 a true signal. I/F 01 being true conditions J2-12 for an IDA to be presented on port 0, selects the video clock signal from the display generator on port 0 (if no display generator is present, this will develop a Device Unavailable signal at H13-4 for the status mux at F14), and enables the setting of the Transmit Error flop (H3) if a T.E. interrupt occurs on port 0 while communications are in progress with a display generator on that port.

A low level on J4-19 will set the interface up in Transmit mode. This low level is felt at Enable pin 9 on H1 & H2. These Quad Bus Transceivers lead directly to the final data output drivers to both ports (M1, M2, M14, M15). Another part of this data transmission is the generating of an odd parity bit to accompany the data going out. H1 & H2 pins 1, 4, 12, and 15 are bussed with the Receive data bits to form the Middle Data Bus. This bus is used to generate parity on transmit and check parity on a receive from the data generator, L8-5 is the even output from the 'S280 parity generator/checker. The data being transmitted is supplied to the 'S280 in a 1's complement format, thus a low on pin 5 is the 1's complement of an odd parity bit being generated. This bit is inverted to be shipped out with the data bits at M3 and M13.

At F9-12 a high will be present indicating a true signal TR=1. This signal enables the ODR1 gate at K5-12 and provides an enable for the BSY circuitry at K9-9.

With the computer providing a true DAG10, this low will give a logical '1' at F8-10. This signal DAG11 will start the BSY circuit at K11-6.

K11-1 is high at this time because the BSY flop is cleared. This high condition selects the 'B' inputs to the BSY Mux. 4 ns after DAG11 goes high pin 7 of K11 goes low. When DAG11 goes low K11-7 will be high. K10-4 will remain high for 11 nsec. This will provide an 11 nsec pulse out on F5-6. TR=1 is high enabling a low pulse out of K9-8. This low will condition the clock input on K6-3 the BSY flop. At the rise of CLKBSYPULSE 0 the BSY flop will set, providing enables on K5-5 for IDA, K5-13 for ODR and BSY1 on F15-2 for status on line 2.

The low out on K6-6 will switch the select on the K11 mux to await an ODA from the display generator. This low will also set up the "D" input on the BSY flop K6 to allow clearing the flop with the receipt of the ODA.

When K5-13 goes high an ODR1 will be true on K5-8. This "one" will provide the signal to N4-2 & 4. The I/F 01 and I/F 11 levels will provide the proper port with an ODR. This ODR will clock the data into the display generator.

With an ODA from the display generator there is a resulting CLKBSYPULSE 0 out of K9-8. This resets BSY K6 which will select the "B" inputs on the K11 mux. BSY being cleared will disable the ODR1 gate at K5-8.

Anytime BSY 0 goes low *or* ADDS140 is low, the '555 at L15 is activated. This timer will provide a 1 Khz signal into L3-4. The last Status Request preset this two stage counter to the value of the switches at L4. For every alteration of the signal at L3-4, the total is counted down by one. At the count of zero in both L2 and L3 the next up-clock on L3-4 will provide a low out at L2-13. Due to the 'L04 at J10-6, there will be a 30 nsec low level at L6-8. This is inverted by F8 and then enables the signal DEVT/OPLS0 low at F7-3 for 30 nsec.

This signal DEVT/OPLS0 is down long enough to set the Device Time Out flop. L14-5 will go high, providing the DEV T/0 bit to the status mux at F13-11.

The low at L14-6 is presented to F6-13 to generate LINE0RUPTPLS0 at a low level thus starting an interrupt sequence. Without explaining the interrupt sequence at this time, it should suffice to say that a status request will preset the counters at L2 and L3, and a signal CMDCLR0 will reset the Device T/0 flop at L14.

The receipt of a command byte (other than a command clear 'XF$_{16}$') with the LSB set will set the interface upt to accept data from the D.G. and transfer this data to the computer bus or storage in memory.

This level also conditions the input of J2-1 to generate a delayed, gate edge (RCVG1) which will set the BSY flop K6, also conditioning the handling of IDR1 and subsequent toggling of the BSY circuitry, thus providing the IDA signals necessary to data transmission from the display generator.

After about 120 ns, the input at H8-4 will go high and along the pin 5 enable pin 6 to go high conditioning J6-6 to go to a 'one' with the receipt of an IDR1 from the display generator. This high level provides the last enable for the IDA signal at K5-6. Also, the K11 multiplexer is conditioned to generate a high out on pin 4. This high will provide a 10 ns 'one' out of F5-8. This pulse will be gated through K9 to generate CLKBSYPULSE0 which will reset the BSY flop K6.

At this time the computer will generate a Data Request (DR) which gates the recently received data into the computer. This DR also goes through the K11 mux to generate CLKBSYPULSE0 which will set the BSY flop for another transfer.

As a result of RCVG1 going high this signal is inverted to provide RCVG0 at a low, which will enable the Tri-state Muxes at L9, 10, & 11.

When a command byte of '$6X_{16}$' is latched into the command register J4, the two Interrupt enable flops at K14 will assume a set condition. The settling of these flops will condition the interrupt logic for handling any display generator interrupts on their associated ports.

Assuming no interrupts are currently being serviced and a prior command has enabled interrupts, an 01WRI signal being sensed on H11-1 will drop H11-6 to a low condition, settling 0INTPEN1 (H10-5) to a true state. This high is felt at the 'S139 decoder mux. Output pin 11 will go low, causing F7-6 to provide 0INTIDAENA1 at a true state.

This signal being high will gate the video clock pulses through K9-6. These clock pulses occur at a rate of 11 MHz. These clock pulses are used to generate a signal called STEPCLKC at N4-11, but only after a slight (100 nsec) delay through the two flops at J13. This delay is needed to prevent clearing the interrupt too quickly, before the data is latched into the interrupt register.

STEPCLKC will then follow the video clock signal and provide pulses for the 4 bit shift register at L1. On the third STEPCLKC pulse the signal at L1-13, INTCLK will go high. This positive transition will control the processing of data on the interrupt sequence. Sensed at H11-9, the output at pin 8 will go low. This low is inverted by J10-10 to provide 0IDAIWR1 at a true state. The IDA signal will knock down the IWR being held in the display generator.

With IWR dropping the level at H11-13 will go low, providing a 30 nsec pulse at J9-6 which will reset 0INTPEN1.

INTCLKC will also provide INTREGLDPLS1 at F6-6 to clock the display generator interrupt word into the interrupt register at F12. INTCLKC will also gate the conditions to set the Transmit Error flop when that bit is detected in the display generator interrupt byte. The signal, SETTE, is sourced at J8-8.

At the same time the INTREGLDPLS1 goes high J7-4 will go low, thus setting the LINE1 flop.

Setting of the LINE1 flop will generate a low signal at K13-8. This signal, INTPEN4UL10, will interrupt the computer and the interrupt sequence will begin. The display generator supplied interrupt word is modified so that the two most significant bits now portray the interrupt status of the complete display generator system. The most significant bit, ALTERNATE, will inform the software whether the other display generator has an interrupt pending. The next most significant bit, MULTIPLE, will inform the software that there is another interrupt pending, on either this port or the other port.

The computer then provides a RACKOG that generates a pulse called INTLOGCLR0. This pulse will clear out the LINE0 and LINE1 flops, the INTHOLD0 flop, the INTREGEMPT1 flop and the two flops at H6 that work on the address 2 Racko. This will enable another interrupt now that the present one has been serviced.

The port 1 interrupts are treated as the port 0 interrupts with the exception that the 'S139 at H9 will have a low at pin 10 if only a port 1 interrupt is present. It both Port 0 and 1 interrupts are sensed at the same time, the output at H9-9 will go low, automatically setting port 0 at the highest priority, thus eliminating any "race" conditions at this point.

The LINE0 flop will be set if a Device Time-Out, End-of-Message or a Receive/Transmit Parity error occurs. The LINE0 interrupt is of a higher priority classification than a LINE1 interrupt. The interrupt process is identical with the exception of the different address associated therewith.

The status byte from address $E1_{16}$ includes eight bits. The two most significant bits are generated by the interface, and the display generator provides the remaining six bits. Of these, the two most significant bits identify the particular display generator generating the interrupt that is being looked at. The next bit (TI) indicates a keyboard interrupt, due to the feed-in of data from a keyboard being operated by a user. The next bit (TE or transmission error) indicates whether there is a problem in communications with a display generator. The next bit indicates end of message (EOM) and the least significant bit indicates a start of message (SOM) interrupt. Thus, the four least significant status bits indicate the type of or reason for the interrupt.

Examples of various illustrative off-the-shelf devices which can be utilized in the present embodiment of the present invention as components thereof are given below. However, the present embodiment is not limited to these particular devices nor the particular manufacturers given below. Other equivalent or similar components can be substituted therefor.

Referring again to FIG. 1, devices M5, M6, M9 and M10 can, for example, each be a Motorola MC3486 device or equivalent. Resistor R1 can, for example, have a resistance of 1K ohms, and can, for example, be biased by a voltage of +5 volts. Devices F10, F11 and L9 can, for example, each be a Texas Instruments SN74S258 device. Tristate multiplexers L10 and L11 can, for example, each be a Texas Instruments SN74S257 device. Gate K7 can, for example, be part of a Texas Instruments SN74S00 device. Parity generator/checker L8 can, for example, be a Texas Instruments SN74S280 device. Device F12 can, for example, be a Texas Instruments SN74S374 device.

Referring again to FIG. 2, resistors R1, R3, R5 and R8, and each of the three resistors in device N12, can, for example, have a resistance of 1K ohms, and can, for example, each be externally biased as shown in the figure by +5 volts. Resistor R6 can, for example, have a resistance of 20K ohms, and can, for example, receive an external bias of +5 volts. Capacitor C3 can, for example, have a capacitance of 200 pf. Devices M7, M8, M11 and N8 can, for example, each be a Motorola MC3486 device. Tristate multiplexers K12 and L12 can, for example, each be a Texas Instruments SN74S258 device having its "B" and Output lines grounded. Gates N4, N4, F1, and F1 each can, for example, be a Texas Instruments SN74S08 integrated circuit. Gates F1, N4, H8, and J2 can, for example, each be a Texas Instruments SN5408 or SN7408 device or a portion thereof. Gate L7 can, for example, be a Texas Instruments SN74S86 integrated circuit or a portion thereof. Gates L6 and J5 can, for example, each be a Texas Instruments SN74S32 integrated circuit or a portion thereof. Gates M12 and M12 can, for example, each be a Texas Instruments SN74H00 integrated circuit or a portion thereof. Flip flops F3, F3, H15, H15, J14 and J14 can, for example, each be a Texas Instruments SN74S74 integrated circuit or a portion thereof. Two-to-one select devices F13, F14 and F15 can, for example, each be a Texas Instruments SN74S257 device. Devices J3 and J3 can, for example, each be a Texas Instruments SN5404 or SN7404 integrated circuit or a portion thereof. Devices K10 and K10 can, for example, each be a Texas Instruments SN74LS04 integrated circuit. Device H13 can, for example, be a Texas Instruments SN74123 integrated circuit. AND/OR INVERT device F2 can, for example be a Texas Instruments SN74LS51 integrated circuit.

Referring again to FIG. 3, resistors R5 and R12 can each, for example, have a resistance of 1K ohms, and can, for example, each have external bias voltage applied thereto of plus five (5) volts. Resistor R7 can, for example, have a resistance of 20K ohms, and can, for example, have a bias voltage applied thereto of plus five (5) volts. Capacitor C4 can, for example, have a capacitance of 200 picofarads. Devices F9, F9, F9 and F8 can, for example, each be a portion of a Texas Instruments SN54H04 or SN74H04 integrated circuit. AND/OR INVERT device F2 can, for example, be a Texas Instruments SN74LS51 integrated circuit. Gates J2, J2, J2 and F1 can, for example, each be a 1-gate portion of a Texas Instruments SN74S08 integrated circuit. OR gates K2, K2, K2 and L6 can, for example, each be a 1-gate portion of a Texas Instruments SN74S32 integrated circuit. Exclusive-OR gate L7 can, for example, be a 1-gate portion of a Texas Instruments SN74S86 Schottky quad EXCLUSIVE-OR gate integrated circuit. NAND gates F7, L13, L13, L13 and L13 can, for example, each be a 1-gate portion of a Texas Instruments SN54S00 or SN74S00 Schottky quadruple 2-input NAND gate integrated circuit. NAND gates J8 can, for example, each be a 1-gate portion of a Texas Instruments SN74S10 Schottky triple 3-input NAND gate integrated circuit. Flip flops H3, H3, K14 and K14 can, for example, each be a 1-flip flop portion of a Texas Instruments SN74S74 Schottky Dual D flip flop integrated circuit. Octal D-type devices F4 and J4 can, for example, each be a Texas Instruments SN74273 integrated circuit. Devices J1, K10 and K10 can, for example, each be a portion of a Texas Instruments SN74LS04 hex inverter integrated circuit. Devices J12 & J12 can, for example, each be a portion of a Texas Instruments SN54L04 or SN74L04 hex inverter integrated circuit. Device H13 can, for example, be a half of a Texas Instruments SN54123 or SN74123 TTL/monostable multivibrator integrated circuit. Gate J9 can, for example, be a 1-gate portion of a Texas Instruments SN5400 or SN7400 quadruple gate.

Referring again to FIG. 4, gate M12 can, for example, be a 1-gate portion of a Texas Instruments SN54H00 or SN74H00 quad 2-input NAND gate integrated circuit. Device L15 can, for example, be a Texas Instruments SN74S55 integrated circuit. Resistors R9, R13, R14, R15, R16, R17, R18, R19, R20 and R8 can each, for example, have a resistance of 1K ohms and an applied external voltage of plus five (5) volts. Resistor R10 can, for example, have a resistance of 5K ohms, and resistor R11 can, for example, have a resistance of 2.5K ohms. Capacitor C5 can, for example, have a capacitance of 0.01 microfarad, and capacitor C6 can, for example, have a capacitance of 0.1 microfarad. Devices J3, J3, J3, J10, K8, K8, K8, J12, J12, J12, K15, K15, K8, K8, J10, K15, K15 and K15 can each, for example, be 1/6 of a Texas Instruments SN54L04 or SN74L04 hex inverter. Four-bit counters L3 and L2 can each, for example, be a Texas Instruments SN54193 or SN74193 up/down binary counter integrated circuit. Devices F9, F8, F8 and F8 can, for example, each be 1/6 of a Texas Instruments SN54H04 or SN74H04 hex inverter integrated circuit. Gates K7, K7 and F7 can, for example, each be a 1-gate portion of a Texas Instruments SN74S00 integrated circuit. Gates H8, J6, J6, F5, F5, L5 and L5 can, for example, each be a 1-gate portion of a Texas Instruments SN74S08 quad AND gate. OR gates J5, J5 and L6 can, for example, each be a 1-gate portion of a Texas Instruments SN74S32 integrated circuit. Devices F8 and J7 can, for example, be 1/6 of a Texas Instruments SN74S04 Schottky hex inverter. AND gates K5 and K5 can, for example, each be a 1-gate portion of a Texas Instruments SN5421 or SN7421 dual 4-input AND gate integrated circuit. Tristate multiplexer K11 can, for example, be a Texas Instruments SN74S258 integrated circuit. Devices K10 and K10 can, for example, each be a portion of a Texas Instruments SN74LS04 integrated circuit. And/or invert gate K9 can, for example, be half of a Texas Instruments SN74S51 integrated circuit. Flip flops K6 and L14 can, for example, each be half of a Texas Instruments SN74S74 integrated circuit. Gate J9 can, for example, be a 1-gate portion of a Texas Instruments SN5400 or SN7400 integrated circuit. Gate H8 can, for example, be a 1-gate portion of a Texas Instruments SN5408 or SN7408 quad 2-input AND gate integrated circuit.

Referring again to FIG. 5, gates H11, H11, J11 and J11 can, for example, each be half of a Texas Instruments SN74S20 Schottky dual 4-input NAND gate integrated circuit. Devices J10, J10, K12, K8 and J10 can, for example, each be 1/6 of a Texas Instruments SN54L04 or SN74L04 hex inverter integrated circuit. Devices J9 and J9 can, for example, each be ¼ of a Texas Instruments SN5400 or SN7400 quad 2-input NAND gate integrated circuit. Flip flops H10, H10, J13, J13, L14, H7, H5, H7, H6, H6 and H5 can, for example, be half of a Texas Instruments SN74S74 Schottky dual D flip flop integrated circuit. Gates H8 and N4 can, for example, each be ¼ of a Texas Instruments SN5408 or SN7408 quad 2-input AND gate integrated circuit. Device F9 can, for example, be 1/6 of a Texas Instruments SN54H04 or SN74H04 hex inverter integrated circuit. Two to four decoder H9 can, for example, be a Texas Instruments SN74S139 integrated circuit. Devices J7, J7, J1, J1, J7 and J7 can, for example, each be 1/6 of a Texas Instruments SN74S04 hex inverter. Gates F7 and F7 can, for example, each be ¼ of a Texas Instruments or SN54S00 SN74S00 Schottky quad 2-input NAND gate. And/or invert gate K9 can, for example, be half of a Texas Instruments SN74S51 integrated circuit. Resistors R2, R5, R21 and R21 can, for example, each have a resistance of 1K ohm, and each have applied thereto a external voltage of plus five (5) volts. Gates F6, F6 and F6 can, for example, each be ⅓ of a Texas Instruments SN74S11 integrated circuit. Gates J6, J6, F5 and F5 can, for example, each be a 1-gate portion of a Texas Instruments Sn74S08 integrated circuit. OR gates L6 and J5 can, for example, each be a 1-gate portion of a Texas Instruments SN74S32 integrated circuit. Four-bit shift register L1 can, for example, be a Texas Instruments SN54194 or SN74194 four-bit bi-directional universal shift register. Devices K13, K13 and K13 can, for example, each be a portion of a Texas Instruments SN74LS04 integrated circuit. Gate J8 can, for example, be ¼ of a Texas Instruments SN74S10 integrated circuit. Gate M12 can, for example, be 1-gate portion of a Texas Instruments SN54H00 or SN74H00 quad 2-input NAND gate.

Referring again to FIG. 6, devices H1 and H2 can each, for example, be an Advanced Micro Devices AM26S12A device. Resistors R4, R22, R23, R24, R25, R26, R27, R28 and R29 can, for example, each have a resistance of 1K ohms and can, for example, each have an external voltage of plus five (5) volts applied thereto. Devices M1, M2, M3, M4, M13, M14 and M15 can, for example, each be an Advanced Micro Devices AM26LS31 device. Devices J1 and F8 can, for example, each be 1/6 of a Texas Instruments SN74S04 Schottky hex inverter. AND gates L5 and L5 can, for example, each be ¼ of a Texas Instruments SN74S08 Schottky quad 2-input AND gate. OR gate K2 can, for example, be ¼ of a Texas Instruments SN74S32 Schottky quad 2-input OR gate. NAND gate K3 can, for example, be ½ of a Texas Instruments SN74S20 Schottky dual 4-input NAND gate. Gate K7 can, for example, be ¼ of a Texas Instruments SN74S00 Schottky quad 2-input NAND gate.

The present embodiment is not limited to the particular devices given above nor to devices from the particular manufacturers given above. Other equivalent components can be substituted therefor.

Obviously, many modifications and variations of the present invention are possible in light of the above teachings. It is therefore to be understood that within the scope of the appended claims, the invention may be practiced otherwise than as specifically described.

What is claimed is:

1. Apparatus for facilitating transfer of an information signal between a first device and a second device, comprising:
   first switching means, receiving a selection signal and adapted to receive a first signal from the first device and a second signal from the second device, for producing the first signal or the second signal, in response to said selection signal, as a third signal;
   first signal generating means receiving said third signal for generating a switching signal in response to said third signal;
   second switching means, receiving said switching signal, and adapted to receive an initialization signal from the first device indicative of the direction of transfer of an information signal, for producing said selection signal indicative of said switching signal and the initialization signal; and
   second generating means receiving said selection signal, adapted to receive the second signal, and adapted to provide an output signal to the second device or producing said output signal indicative of said selection signal and the second signal to inform the second device whether or not to receive or cease producing information signals.

2. Apparatus for transmission of information signals from a first device to a second device, comprising:
   first switching means, receiving a selection signal, adapted to receive a first signal from the first device indicative of whether the first device is ready to provide an information signal to the second device, and adapted to receive a second signal from the second device indicative of whether the second device is ready to receive an information signal, for producing the first signal or the second signal, in response to said selection signal, as a third signal;
   first signal generating means receiving said third signal for generating a switching signal indicative of said third signal;
   second switching means receiving said switching signal, and adapted to receive an initialization signal from one device for producing said selection signal indicative of said switching signal and the initialization signal;
   second signal generating means receiving said selection signal, adapted to receive the second signal, and adapted, to provide an output signal to the second device, for producing said output signal indicative of said selection signal and the second signal to inform the second device whether an information signal is available for transmission to the second device; and
   data handling means adapted to receive the information signal, the first signal and the second signal, and adapted to provide the information signal to the second device in response to the second signal.

3. Apparatus as recited in claim 1 or 2 wherein said first switching means comprises a multiplexer whose multiplexing state is determined by said selection signal.

4. Apparatus as recited in claim 1 or 2 wherein said second switching means comprises a flipflop whose initial state for facilitating transfer of an information signal is determined by the initialization signal, and whose state is changed by said switching signal.

5. Apparatus as recited in claim 1 or 2 wherein said first signal generating means comprises pulse generating means for producing a pulse in response to changes in said third signal.

6. Apparatus as recited in claim 1 or 2 wherein said second signal generating means comprises gating means producing said output signal in response to said selection signal and nonpresence of the second signal.

* * * * *